US012560015B2

(12) United States Patent
McKibben et al.

(10) Patent No.: US 12,560,015 B2
(45) Date of Patent: Feb. 24, 2026

(54) DOOR HARDWARE NOISE REDUCTION AND EVALUATION

(71) Applicant: Schlage Lock Company LLC, Carmel, IN (US)

(72) Inventors: Aaron P. McKibben, Fishers, IN (US); Gregory Musselman, Indianapolis, IN (US); Brian C. Eickhoff, Danville, IN (US); Paul R. Arlinghaus, Fishers, IN (US); Vijayakumar Mani, Bangalore (IN); Benjamin L. Miller, Indianapolis, IN (US); Saagar Mohammed, Alappuzha (IN)

(73) Assignee: Schlage Lock Company LLC, Carmel, IN (US)

( * ) Notice: Subject to any disclaimer, the term of this patent is extended or adjusted under 35 U.S.C. 154(b) by 906 days.

(21) Appl. No.: 16/433,241

(22) Filed: Jun. 6, 2019

(65) Prior Publication Data

US 2019/0376331 A1 Dec. 12, 2019

Related U.S. Application Data

(60) Provisional application No. 62/681,275, filed on Jun. 6, 2018.

(51) Int. Cl.

*E05F 5/10* (2006.01)
*E05B 65/10* (2006.01)
*E05F 1/12* (2006.01)

(52) U.S. Cl.

CPC ............ *E05F 5/10* (2013.01); *E05B 65/1053* (2013.01); *E05F 1/1261* (2013.01); *E05Y 2900/132* (2013.01)

(58) Field of Classification Search

CPC ............ Y10T 292/57; Y10T 292/0908; Y10T 292/0909; Y10T 292/091; E05F 5/10;

(Continued)

(56) References Cited

U.S. PATENT DOCUMENTS 2,098,776 A 11/1937 Edwards
2,125,779 A * 8/1938 Geyer ..................... E05B 77/38 292/DIG. 56

(Continued)

FOREIGN PATENT DOCUMENTS

CN 103302382 A * 9/2013
DE 202011002692 U1 * 7/2011 ......... E05B 17/0041

(Continued)

*Primary Examiner* — Steven A Tullia

(74) *Attorney, Agent, or Firm* — Taft Stettinius & Hollister LLP

(57) ABSTRACT

An example exit device includes a mounting assembly configured for mounting to a door, a pushbar movably mounted to the mounting assembly, a latchbolt mounted to the mounting assembly for movement between an extended position and a retracted position, and a rocker lever engaged between the pushbar and the latchbolt such that the pushbar is operable to move the latchbolt between the extended position and the retracted position. The exit device further includes impact dampener mounted to the exit device and configured to dampen impact between a first component of the exit device and a second component of the exit device during movement of the first component relative to the second component.

20 Claims, 27 Drawing Sheets

(58) Field of Classification Search
CPC ................ E05F 1/1261; E05B 65/1053; E05B 17/0045; E05B 17/0041; E05B 77/36; E05B 77/42; E05Y 2900/132; Y10S 292/56
See application file for complete search history.

(56) References Cited

U.S. PATENT DOCUMENTS

| | | | | | |
|---|---|---|---|---|---|
| 2,142,425 | A | * | 1/1939 | Tringale | E05B 77/38 292/DIG. 72 |
| 3,058,704 | A | * | 10/1962 | Bergstedt | B32B 15/08 244/119 |
| 3,160,549 | A | * | 12/1964 | Caldwell | B32B 27/00 244/119 |
| 3,399,103 | A | * | 8/1968 | Salyer | B32B 15/08 428/116 |
| 3,458,225 | A | * | 7/1969 | Stuteville | E05B 65/1066 70/92 |
| 3,767,238 | A | | 10/1973 | Zawadzki | |
| 4,190,131 | A | * | 2/1980 | Robinson | G10K 11/168 181/290 |
| 4,223,073 | A | * | 9/1980 | Caldwell | B32B 15/18 165/84 |
| 4,513,473 | A | * | 4/1985 | Omata | G11B 15/67507 188/290 |
| 4,545,606 | A | * | 10/1985 | Vodra | E05B 65/1053 292/216 |
| 4,709,950 | A | * | 12/1987 | Zortman | E05B 65/104 70/92 |
| 4,734,323 | A | * | 3/1988 | Sato | B60R 13/0815 181/294 |
| 4,796,931 | A | * | 1/1989 | Heid | E05B 65/1053 292/DIG. 60 |
| 5,020,838 | A | * | 6/1991 | Fukumoto | E05B 81/14 292/216 |
| 5,067,757 | A | | 11/1991 | Cohrs et al. | |
| 5,129,879 | A | | 7/1992 | Mattson | |
| 5,895,013 | A | * | 4/1999 | Towfiq | B64C 1/40 244/119 |
| 5,904,232 | A | * | 5/1999 | Shen | E05B 13/101 192/69.62 |
| 6,202,462 | B1 | * | 3/2001 | Hansen | B32B 15/04 72/200 |
| 6,409,238 | B1 | | 6/2002 | Mikenis et al. | |
| 6,536,080 | B2 | | 3/2003 | Bella et al. | |
| 6,536,555 | B1 | * | 3/2003 | Kelsic | G11B 33/08 181/207 |
| 6,601,881 | B2 | * | 8/2003 | Mandell | E05B 65/1073 292/345 |
| 6,733,049 | B2 | | 5/2004 | Piorkowski et al. | |
| 7,007,341 | B2 | | 3/2006 | Wang | |
| 7,172,800 | B2 | * | 2/2007 | Boss | B32B 7/022 720/716 |
| 7,264,096 | B2 | * | 9/2007 | Hayashi | F16F 9/12 188/290 |
| 7,350,629 | B2 | * | 4/2008 | Anton | E05F 5/00 188/82.1 |
| 7,393,575 | B2 | * | 7/2008 | Boss | B32B 27/20 720/716 |
| 7,740,116 | B2 | | 6/2010 | Cultraro | |
| 7,815,228 | B2 | | 10/2010 | Grunow et al. | |
| 7,975,351 | B2 | | 7/2011 | King | |
| 8,042,660 | B2 | | 10/2011 | Cultraro | |
| 8,097,194 | B2 | * | 1/2012 | Boss | B32B 27/20 264/261 |
| 8,123,262 | B2 | | 2/2012 | Meernik et al. | |
| 8,182,003 | B2 | * | 5/2012 | Dye | E05B 65/1053 292/216 |
| 8,479,876 | B2 | * | 7/2013 | Fetsko | B60R 13/08 181/207 |
| 8,544,898 | B2 | | 10/2013 | Zimmer et al. | |
| 8,616,591 | B2 | | 12/2013 | Parker | |
| 8,720,641 | B2 | * | 5/2014 | Fisk | B32B 7/14 181/290 |
| 8,776,315 | B2 | | 7/2014 | Wach et al. | |
| 8,824,148 | B2 | | 9/2014 | Kim | |
| 8,959,710 | B2 | | 2/2015 | Wach et al. | |
| 9,168,880 | B2 | * | 10/2015 | Adams | G10K 11/168 |
| 9,545,152 | B2 | | 1/2017 | Egger | |
| 9,663,969 | B2 | | 5/2017 | Lila | |
| 9,828,793 | B2 | | 11/2017 | Shah | |
| 9,978,353 | B2 | * | 5/2018 | Seto | F16F 15/02 |
| 11,142,929 | B2 | * | 10/2021 | Griswold | E05B 65/1053 |
| 11,220,838 | B2 | * | 1/2022 | McKibben | E05B 17/0041 |
| 2002/0105191 | A1 | * | 8/2002 | Surko, Jr. | E05B 65/1073 292/92 |
| 2002/0170143 | A1 | * | 11/2002 | Vitry | B60R 7/06 16/231 |
| 2006/0012187 | A1 | * | 1/2006 | Adachi | E05B 17/0041 292/304 |
| 2006/0134449 | A1 | * | 6/2006 | Sigler | B32B 27/18 428/624 |
| 2006/0150512 | A1 | * | 7/2006 | Heithe | E05B 65/10 49/141 |
| 2009/0183821 | A1 | * | 7/2009 | Schroeder | B32B 33/00 156/242 |
| 2010/0026012 | A1 | | 2/2010 | Lin | |
| 2010/0043505 | A1 | * | 2/2010 | Tien | E05B 65/1053 70/92 |
| 2010/0045053 | A1 | * | 2/2010 | Dye | E05B 65/1053 292/201 |
| 2010/0253101 | A1 | | 10/2010 | Seto et al. | |
| 2012/0032455 | A1 | | 2/2012 | Lin | |
| 2012/0126548 | A1 | | 5/2012 | Zhuo | |
| 2013/0276375 | A1 | | 10/2013 | Carmona et al. | |
| 2015/0035298 | A1 | | 2/2015 | Yokoo | |
| 2015/0184426 | A1 | * | 7/2015 | Arlinghaus | E05B 65/108 292/138 |
| 2015/0240540 | A1 | | 8/2015 | John | |
| 2016/0115719 | A1 | | 4/2016 | Coleman et al. | |
| 2016/0130846 | A1 | | 5/2016 | Shah | |
| 2016/0177611 | A1 | * | 6/2016 | Rissone | E05B 15/025 267/139 |
| 2016/0230423 | A1 | * | 8/2016 | Lehner, Jr. | E05B 65/1093 |
| 2016/0258195 | A1 | | 9/2016 | Fukumoto | |
| 2016/0326771 | A1 | | 11/2016 | Qi | |
| 2016/0333621 | A1 | | 11/2016 | Lehner, Jr. et al. | |
| 2016/0340942 | A1 | | 11/2016 | Anderson et al. | |
| 2017/0275918 | A1 | | 9/2017 | Colligan | |
| 2018/0044955 | A1 | | 2/2018 | Shah | |
| 2018/0058110 | A1 | * | 3/2018 | Colligan | E05B 17/0041 |
| 2018/0128015 | A1 | * | 5/2018 | Shah | E05B 65/1053 |
| 2019/0309543 | A1 | * | 10/2019 | Griswold | E05B 65/1093 |

FOREIGN PATENT DOCUMENTS

| | | | | | |
|---|---|---|---|---|---|
| DE | 102012209335 | A1 | * | 12/2013 | B32B 15/06 |
| DE | 102016104765 | A1 | * | 9/2017 | E05B 47/0012 |
| DE | 102016104779 | A1 | * | 9/2017 | E05B 47/0012 |
| EP | 0860605 | A1 | * | 9/1992 | E05F 3/14 |
| EP | 605327 | A1 | * | 7/1994 | B32B 37/0038 |
| EP | 1270927 | A1 | * | 1/2003 | F02B 77/13 |
| EP | 2439363 | A2 | * | 4/2012 | E05B 17/0041 |
| EP | 3156568 | A1 | * | 4/2017 | E05B 47/0657 |
| GB | 2214556 | A | * | 9/1989 | E05B 17/0041 |
| JP | 03047384 | A | * | 2/1991 | E05B 65/1046 |
| WO | 2000050710 | A1 | | 8/2000 | |
| WO | WO-2011106244 | A2 | * | 9/2011 | F02M 59/44 |
| WO | WO-2013024202 | A1 | * | 2/2013 | E05B 17/0045 |

* cited by examiner

DOOR HARDWARE NOISE REDUCTION AND EVALUATION

CROSS-REFERENCE TO RELATED APPLICATIONS

The present application claims the benefit of U.S. Provisional Patent Application No. 62/681,275, Filed Jun. 6, 2018, the contents of which are incorporated herein by reference in their entirety.

TECHNICAL FIELD

The present disclosure generally relates to the reduction and evaluation of the noise generated during the operation of door hardware, and more particularly but not exclusively relates to systems and methods for reducing and evaluating the noise generated during the operation of exit devices.

BACKGROUND

Acoustic noise is becoming a growing concern in many different environments, including theaters, auditoriums, schools, libraries, and healthcare settings. Noise is of particular concern in healthcare settings, such as hospitals, nursing homes, and mental health facilities. In healthcare settings, a loud environment can affect the sleep of patients, which can be detrimental to their recovery times. Noise is often one of the lowest scoring items on patient surveys, which can lead to lower reimbursements to the medical facility. In addition to disturbing patients, noise can also be distracting or bothersome to the medical staff, and may lead to loss of focus and errors.

In many settings, door hardware can be a significant factor contributing to undesirable environmental noise. When a person enters or exits a room through a door, the hardware can make loud and distracting sounds. Building codes and other regulatory requirements often dictate that certain doors be equipped with exit devices, which can be louder than certain other types of door hardware. While many manufacturers have made efforts to reduce the noise generated by their devices, certain conventional exit devices nonetheless generate noise in excess of the maximum recommended levels set forth in industry guidelines.

The door hardware industry has many formal standards governed by third parties, including UL (formerly known as Underwriters Laboratories), the Builders Hardware Manufacturers Association (BHMA), the American National Standards Institute (ANSI), and others. These standards are used within the industry to standardize the methods of evaluating and quantifying the performance of products in a number of categories, including longevity, strength, environmental impact, and actuation forces. However, there is not currently an industry-wide standard for evaluating and quantifying the sound output performance of door hardware. This has led to variations in the manner in which noise generation is evaluated and quantified by different industry groups, such as hardware manufacturers and standards organizations. With different metrics being used by different groups, potential consumers may find it difficult to evaluate the sound output performance of a variety of types of door hardware in like-for-like comparisons.

As is evident from the foregoing, certain conventional exit devices generate more noise than is desirable in many environments. Additionally, the lack of an industry-accepted standard for quantifying the noise generation of door hardware has hindered the development of a common metric by which the noise performance of different types of door hardware can be compared and evaluated. For these reasons among others, there remains a need for further improvements in this technological field.

SUMMARY

An exemplary noise-reducing mechanism for door hardware includes a housing, a damper, and a stop. The door hardware includes a first component and a second component, and an operational movement of the door hardware causes relative movement of the first and second components. The housing is mounted to the first component, and the damper is mounted to the housing. The stop is mounted to the second component such that the stop engages the damper during the operational movement. The damper is configured to slow the operational movement, thereby reducing noise generated by operation of the door hardware. Further embodiments, forms, features, and aspects of the present application shall become apparent from the description and figures provided herewith.

DETAILED DESCRIPTION OF ILLUSTRATIVE EMBODIMENTS

Figure 1:
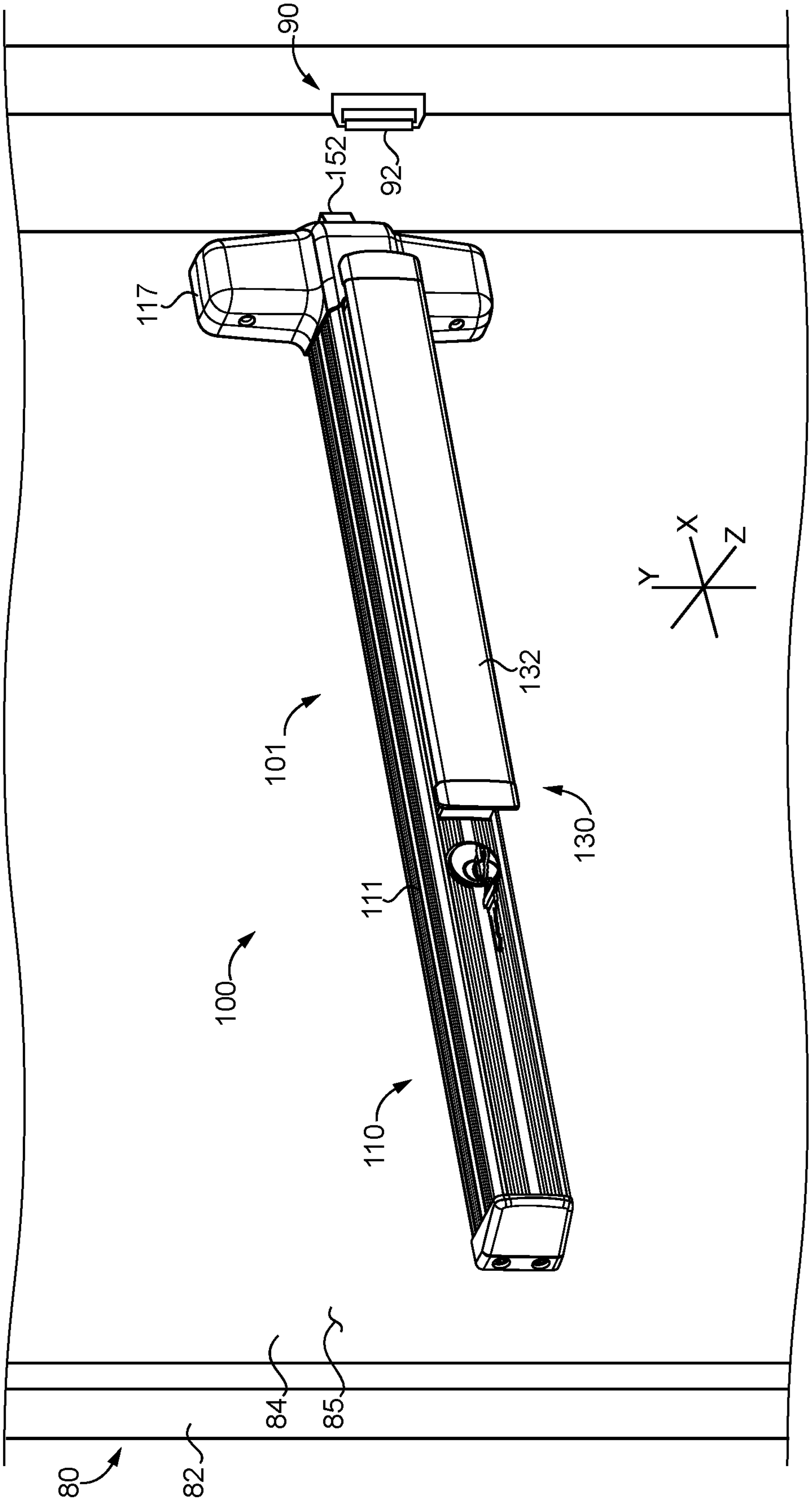
FIG. 1 is an illustration of an exit device installed to a door.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

As used herein, the terms "longitudinal," "lateral," and "transverse" are used to denote motion or spacing along three mutually perpendicular axes. In the coordinate system illustrated in FIGS. 1 and 2, the X-axis defines the longitudinal directions, the Y-axis defines first and second transverse directions, and the Z-axis defines first and second lateral directions. Additionally, the longitudinal directions may alternatively be referred to as the proximal direction (to the right in FIG. 2) and the distal direction (to the left in FIG. 2). These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

Referring now to FIG. 1, illustrated therein is a closure assembly 80 including a frame 82 and a swinging door 84 pivotally mounted to the frame 82. The door 82 has an interior side face 85 and an opposite exterior side face. The door 84 is mounted to the frame 82 by a set of hinges such that a pushing force on the interior side face 85 urges the door 84 to swing outwardly in an opening direction. An exit device 100 is mounted to the interior side face 85 of the door 84, and is configured to interact with a strike 90 to selectively retain the door 84 in a closed position relative to the frame 82. While other forms are contemplated, the illustrated strike 90 is mounted to the interior side of the frame 82, and includes a roller 92.

Figure 2:
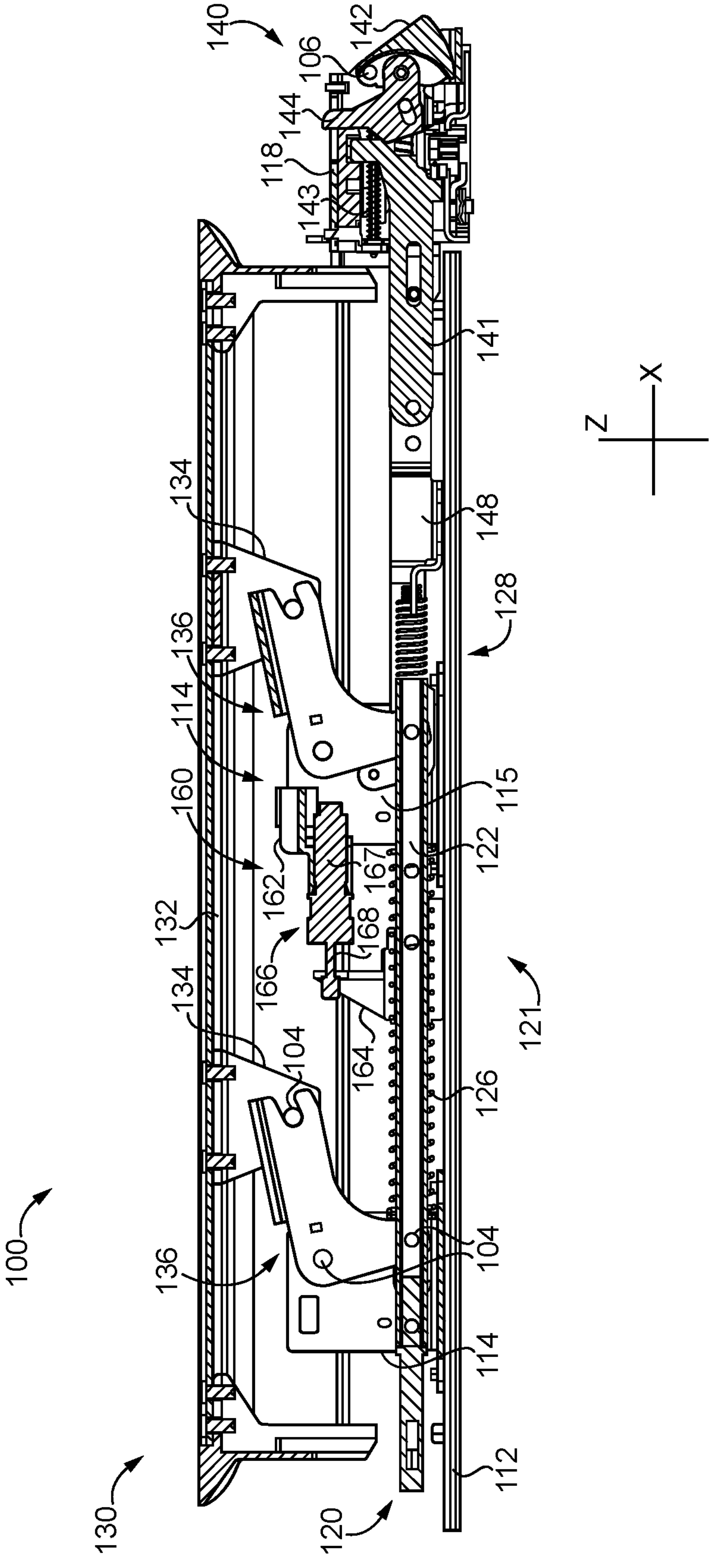
FIG. 2 is a cross-sectional illustration of the exit device.

With additional reference to FIG. 2, the exit device 100 includes a pushbar assembly 101. The pushbar assembly 101 includes a mounting assembly 110 configured for mounting to the door 84, a drive assembly 120 including a pushbar mechanism 130, and a latch control assembly 140 operably connected with the drive assembly 120. The pushbar mechanism 130 is operable to transition the drive assembly 120 from a deactuated state to an actuated state when manually actuated by a user. Actuation of the drive assembly 120 causes a corresponding actuation of the latch control assembly 140, thereby moving a latchbolt 142 to a retracted position. When in the retracted position, the latchbolt 142 is capable of clearing the strike 90 such that the door 84 can be moved from the closed position. As described herein, the exit device 100 is capable of a plurality of operational movements, one or more of which involves retraction and/or extension of the latchbolt 142.

The mounting assembly 110 generally includes an elongated channel member 111, a base plate 112 mounted in the channel member 111, and a pair of bell crank mounting brackets 114 coupled to the base plate 112. The channel member 111 extends in the longitudinal (X) direction, has a width in the transverse (Y) direction, and has a depth in the lateral (Z) direction. Each of the mounting brackets 114 includes a pair of transversely spaced walls 115 which extend laterally away from the base plate 112. The illustrated mounting assembly 110 also includes a header plate 116 positioned adjacent a proximal end of the channel member 111, and a header casing 117 mounted to the header plate 116. The mounting assembly 110 also includes a header bracket 118, which is mounted to the header plate 116 within the header casing 117.

The drive assembly 120 includes the pushbar mechanism 130, a drive bar 122 connected between the pushbar mechanism 130 and the latch control assembly 140, and a return spring 126 engaged with the drive bar 122 and the mounting assembly 110. The return spring 126 biases the drive bar 122 in a distal extending direction, thereby biasing the drive assembly 120 toward its deactuated state.

The pushbar mechanism 130 generally includes a manually actuated pushbar 132, a pair of pushbar brackets 134 coupled to the underside the pushbar 132, and a pair of bell cranks 136 operably connecting the pushbar 132 with the drive bar 122. Each bell crank 136 is pivotably mounted to a corresponding one of the bell crank mounting brackets 114, and includes a first arm pivotably connected to a corresponding one of the pushbar brackets 134 and a second arm pivotably connected to the drive bar 122. The pivotal connections may, for example, be provided by pivot pins 104. The pushbar 132 is laterally movable between an extended or deactuated position and a depressed or actuated position, and the bell cranks 136 translate lateral movement of the pushbar 132 to longitudinal movement of the drive bar 122.

Figure 3:
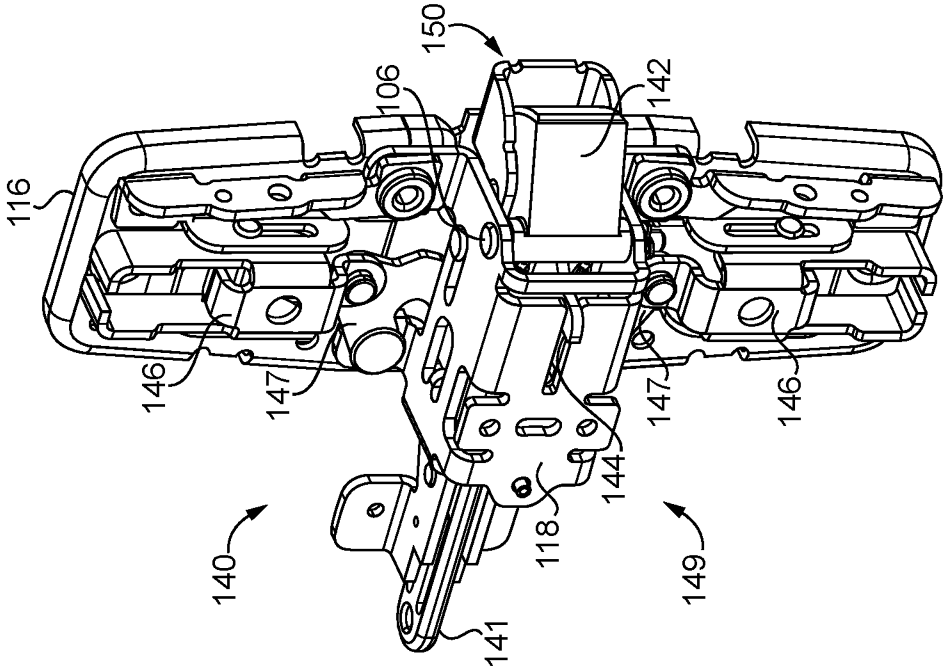
FIG. 3 is an illustration of a latch control assembly of the exit device.

With additional reference to FIG. 3, the latch control assembly 140 generally includes a longitudinally-sliding control link 141, a pivoting latchbolt 142, a retractor 144 connected between the control link 141 and the latchbolt 142, and a fork link 148 connected between the control link 141 and the drive assembly 120. The latchbolt 142 is pivotably mounted to the header bracket 118 by a pivot pin 106 such that the latchbolt 142 pivots between an extended latching position and a retracted unlatching position. The latchbolt 142 may be biased toward the extended position, for example by a spring 143 engaged with the retractor 144. The fork link 148 is connected with the drive rod 122 of the drive assembly 120, such that actuation of the drive assembly 120 drives the latchbolt 142 toward its retracted position. The latch control assembly 140 further includes a pair of laterally-sliding connector links 146, each of which is connected to the control link 141 via a corresponding pivot crank 147.

While the illustrated latch control assembly 140 includes a latchbolt 142 that is mounted in the header case 117, it is also contemplated that the latch control assembly 140 may take another form. For example, the latch control assembly 140 may include one or more remote latching mechanisms in addition to or in lieu of the illustrated latchbolt 142. Such remote latching mechanisms may, for example, be provided as a top latch mechanism configured to engage the top jamb of a door frame, and/or as a bottom latch mechanism configured to engage the floor. The remote latching mechanisms may be connected to the connector links 146 via a connector, such as a rod or a cable. In such forms, movement of the connector links 146 in a laterally inward retracting direction (i.e., toward one another) may serve to actuate the remote latching mechanisms. One example of such a remote latching mechanism 150 is described below with reference to FIG. 25.

The control link 141, the connector links 146, the pivot cranks 147, and the fork link 148 may alternatively be referred to as the control components 149 of the latch control assembly 140. Each of the control components 149 has an extended position and a retracted position, and a corresponding extending direction and retracting direction. Each operating component 149 is configured to move in its retracting direction (i.e., toward its retracted position) in response to actuation of the drive assembly 120, and to move in its extending direction (i.e., toward its extended position) in response to deactuation of the drive assembly 120. As will be appreciated, the extending and retracting directions for one component 149 may be different from the extending and retracting directions for another component 149. By way of example, the extending and retracting directions for the control link 141 and the fork link 148 are longitudinal directions, the extending and retracting directions for the connector links 146 are lateral directions, and the extending and retracting directions for the pivot cranks 147 are rotational directions.

In the illustrated embodiment, the control components 149 are operationally coupled with one another for joint movement between the extended and retracted positions thereof. As a result, movement of one of the control components 149 causes a corresponding movement of the remaining components 149, and increasing or decreasing the movement speed of one of the components 149 can cause a corresponding increase or decrease in the movement speed of the remaining components 149. Additionally, the latchbolt 142 and the retractor 144 are operationally coupled with one another for joint movement between the extended and retracted positions thereof, and are operationally coupled with the control components 149 via a lost motion connection that enables the latchbolt 142 to move from its extended position to a partially retracted position without driving the operating components from the extended positions thereof.

One operational movement of the exit device 100 is a drive assembly operational movement, which involves actuation and free release of the drive assembly 120. More specifically, the drive assembly operational movement involves depressing the pushbar 132 to drive the drive assembly 120 to its actuated state, and releasing the pushbar 132 to allow the drive assembly 120 to return to its deactuated state under free release conditions. The drive assembly operational movement described herein may alternatively be referred to as a pushbar actuation/release operational movement.

The drive assembly operational movement may begin with each of the drive assembly 120 and the latch control assembly 140 in the deactuated state thereof. In this state, the latchbolt 142 is in its extended position, and is operable to engage the strike 90 to retain the door 84 in the closed position. If a user attempts to open the door 84 with the latchbolt 142 in the extended position (e.g., by applying a pushing force to the interior side face 85), outward swinging motion of the door 84 is prevented by engagement of the latchbolt 142 with the strike 90.

The drive assembly operational movement involves actuating the drive assembly 120, for example by manually driving the pushbar 132 to its depressed position. As the pushbar 132 is depressed, the bell cranks 136 translate the laterally-inward retracting motion of the pushbar 132 to distal retracting motion of the drive bar 122. As a result, the control link 141 retracts the retractor 144, which in turn drives the latchbolt 142 to the retracted position. In the retracted position, the latchbolt 142 is able to clear the strike roller 92 to permit opening of the door 84.

The drive assembly operational movement may also involve releasing the pushbar 132 to allow the drive assembly 120 to return to its deactuated state under free release conditions. When the pushbar 132 is released, the spring 126 urges the drive assembly 120 toward the deactuated state, thereby enabling the latch control assembly 140 to return to its deactuated state under the internal biasing forces of the exit device 100.

Another operational movement of the exit device 100 is a relatching operational movement which may, for example, occur during closing of the door 84. The relatching operational movement generally involves the latch control assembly 140 being driven to its actuated state by an external component (e.g., the strike 90), and subsequently returning to its deactuated state under free release conditions. The relatching operational movement may begin with the door 84 in an open position, and the drive assembly 120 and latch control assembly 140 in the deactuated states thereof. As the door 84 approaches its closed position, the strike 90 engages and depresses the latchbolt 142, thereby driving the latch control assembly 140 to its actuated state. As the door 84 reaches its fully closed position, the latchbolt 142 clears the strike 90, and the latch control assembly 140 returns to its deactuated state under the force of the internal biasing mechanisms of the exit device 100.

The exit device 100 may include one or more lost motion connections which enable the drive assembly 120 to remain in the deactuated state as the latchbolt 142 is driven to its retracted position by the strike 90. In the illustrated form, a lost motion connection 128 is formed between the drive assembly 120 and the latch control assembly 140, and more specifically is provided between the drive rod 122 and the fork link 148. The lost motion connection 128 transmits pulling forces between the drive rod 122 and fork link 148, such that retraction of the drive rod 122 causes a corresponding retracting movement of the fork link 148. However, the lost motion connection 128 does not transmit pushing forces between the drive rod 122 and the fork link 148, such that distal retracting movement of the fork link 148 does not cause a corresponding distal retracting movement of the drive bar 122. As a result, the deactuated drive assembly 120 does not materially affect the operation of the latch control assembly 140 during the relatching operation.

The lost motion connection 128 may include a return spring 129 that compresses to store the energy of the distal force exerted by the fork link 148 as the latch control assembly 140 moves to its actuated state. When the latch control assembly 140 becomes free to return to its deactuated state (e.g., when the latchbolt 142 clears the strike 90), the spring 129 releases the stored energy by expanding, thereby driving the fork link 148 in the proximal direction and returning the latch control assembly 140 to its deactuated state.

In certain embodiments, the exit device 100 may include a noise reduction mechanism in the form of a drive rod damper assembly 160. In the illustrated form, the drive rod damper assembly 160 includes a housing bracket 162 mounted to the proximal mounting bracket 114, a stop arm 164 mounted to the drive rod 122, and a damper 166. The damper 166 includes a body portion 167 mounted to the housing bracket 162, and a plunger 168 movably mounted to the body portion 167. The plunger 168 has a depressed position and a projected position, and is biased toward the projected position, for example by a spring mounted within the body portion. The damper 166 is configured to resist movement of the plunger 168 from the projected position to the depressed position. Such movement of the plunger 168 may, for example, be resisted by the spring that biases the plunger 168 toward the projected position. In certain embodiments, the damper 166 may be provided as a fluid damper, and movement of the plunger 168 may further be resisted a fluid contained within the body portion 167.

With the drive assembly 120 in the deactuated state, the drive bar 122 is in its proximal position, and the stop arm 164 is engaged with the damper 166 and retains the plunger 168 in its depressed position. As the drive assembly 120 is actuated, the drive bar 122 and stop arm 164 move in the distal retracting direction, and the plunger 168 moves to its projected position under the internal biasing force of the damper 166. When the pushbar 132 is released, the drive assembly 120 returns to its deactuated state under the biasing force of the main spring 126, and the stop arm 164 engages the damper 166 and urges the plunger 168 to its depressed position. With such movement of the plunger resisted by the damper 166, the damper 166 slows the deactuating movement of the drive assembly 120, thereby reducing noise generated during deactuation of the drive assembly 120 under free release of the pushbar 132.

As noted above, the drive assembly 120 of the illustrated exit device 100 is connected to the latch control assembly 140 via a lost motion connection 128, which provides for unidirectional transmission of pulling forces between the drive bar 122 and the fork link 148. As a result, actuation of the drive assembly 120 causes a corresponding actuation of the latch control assembly 140, such that the drive rod damper assembly 160 may slow deactuation of the latch control assembly 140 during the deactuation of the drive assembly 120 in the drive assembly operational movement. During the relatching operational movement, by contrast, the latch control assembly 140 transitions to the actuated state under the force of the strike 90, and the lost motion connection 128 permits the drive assembly 120 to remain in its deactuated state. Thus, when latchbolt 142 clears the strike 90 and the latch control assembly 140 returns to its deactuated state, the damper assembly 160 does not slow such deactuating movement of the latch control assembly 140.

Figure 4:
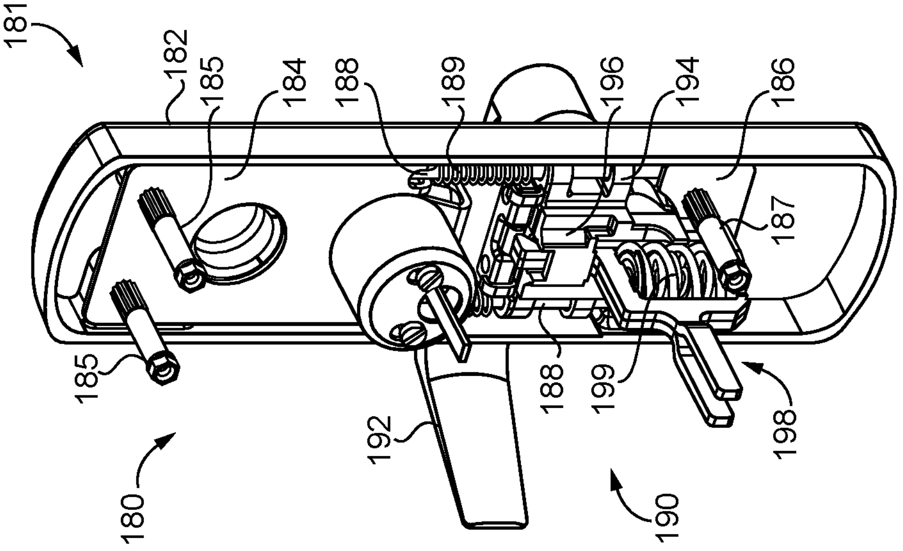
FIG. 4 is an illustration of a trim assembly that may be included in or used in association with the exit device.

With additional reference to FIG. 4, the exit device 100 may further include a trim assembly 180 configured for mounting to the unsecured side of the door 84. The illustrated trim assembly 180 includes a mounting assembly 181 and an actuating assembly 190 movably mounted to the mounting assembly 181. The mounting assembly 181 includes an escutcheon 182, an upper base plate 184, a lower base plate 186, and a pair of guide rods 188. The base plates 184, 186 are mounted to the escutcheon 182 and support the guide rods 188. A pair of upper standoffs 185 are mounted to the upper base plate 184, and a pair of lower standoffs 187 are mounted to the lower base plate 186. A pair of biasing springs 189 are mounted to the guide rods 188 and are captured between the base plates 184, 186.

The actuating assembly 190 includes a handle 192 rotatably mounted to the escutcheon 182, a cam 194 coupled with the handle 192, a slide plate 196 engaged with the cam 194, a lift arm 198 mounted to the slide plate 196, and a drive spring 199 engaged between the slide plate 196 and the lift arm 198. The slide plate 196 is mounted to the guide rods 188 for sliding movement between a deactuated position and an actuated position, and is biased toward the deactuated position (downward in FIG. 4) by the biasing springs 199. Additionally, the lift arm 198 extends through the header plate 116 and is positioned adjacent the lower connector link 146, such that the lift arm 198 is capable of driving the connector link 146 in its retracting direction (upward in FIG. 3).

With the trim assembly 180 assembled to the exit device 100, the exit device 100 has a trim operational movement, which involves actuation and free release of the trim assembly 180. The trim operational movement may begin with each of the drive assembly 120, the latch control assembly 140, and the trim assembly 180 in the deactuated states thereof. In this state, the handle 192 is in a home position, and the slide plate 196 is in the deactuated position. When the handle 192 is rotated from a home position toward a rotated position, the cam 194 drives the slide plate 196 toward the actuated position against the force of the biasing springs 189. Movement of the slide plate 196 is transmitted to the lift arm 198 by the drive spring 199, such that the lift arm 198 drives the lower connector link 146 in its retracting direction. Retraction of the connector link 146 is transmitted to the control link 141 by the pivot cranks 127, thereby causing the control link 141 to retract the latchbolt 142. When the handle 192 is subsequently released, the slide plate 196 returns to the deactuated position under the force of the biasing springs 189, thereby returning the handle 192 and the cam 194 to the home position. Movement of the slide plate 196 to its deactuated position also causes a corresponding movement of the lift arm 198, thereby enabling the latch control assembly 140 to return to its deactuated state.

As will be appreciated, actuation of the latch control assembly 140 by the trim assembly 180 does not cause a corresponding actuation of the drive assembly 120. More specifically, the lost motion connection 128 enables the drive assembly 120 to remain in the deactuated state during actuation of the trim assembly 180. As a result, the drive rod damper assembly 160 does not slow the deactuating movement of the latch control assembly 140 and the trim assembly 180 during the trim operational movement. Furthermore, the return spring 129 operates in the manner described above to aid in returning the latch control assembly 140 to its deactuated state after actuation by the trim assembly 180.

It has been found that during operation of the exit device 100, various components may contact one another in a manner that results in the generation of audible noise. In certain circumstances, it may be desirable to provide the exit device 100 with one or more noise reduction mechanisms configured to reduce the amount of audible noise generated during operation. Exemplary forms of noise reduction mechanisms according to certain embodiments will now be described with reference to FIGS. 5-24.

The noise reduction mechanisms described herein may be used individually or in combination to reduce the noise generated by door hardware, such as an exit device. While the noise reduction mechanisms are illustrated and described herein as being configured for use with the exit device 100 illustrated in FIGS. 1-4, it is to be appreciated that the principles described herein may be applied to achieve similar noise reductions for other types of door hardware, including other forms of exit devices. Various components of the noise reduction mechanisms described herein may be formed of materials having a relatively low hardness, such as plastic, rubber, elastic, and/or polymeric materials. When positioned between two components formed of a relatively harder material, a component formed of a lower-hardness material may reduce noise-producing vibrations that would otherwise be caused by contact between the harder components, such as vibrations resulting from rattle, impact, and/or sliding engagement. Certain components may be made of a noise damping metal material, such as the QUIET STEEL® noise damping steel material available from Material Sciences Corporation (Canton, Michigan).

Figure 5:
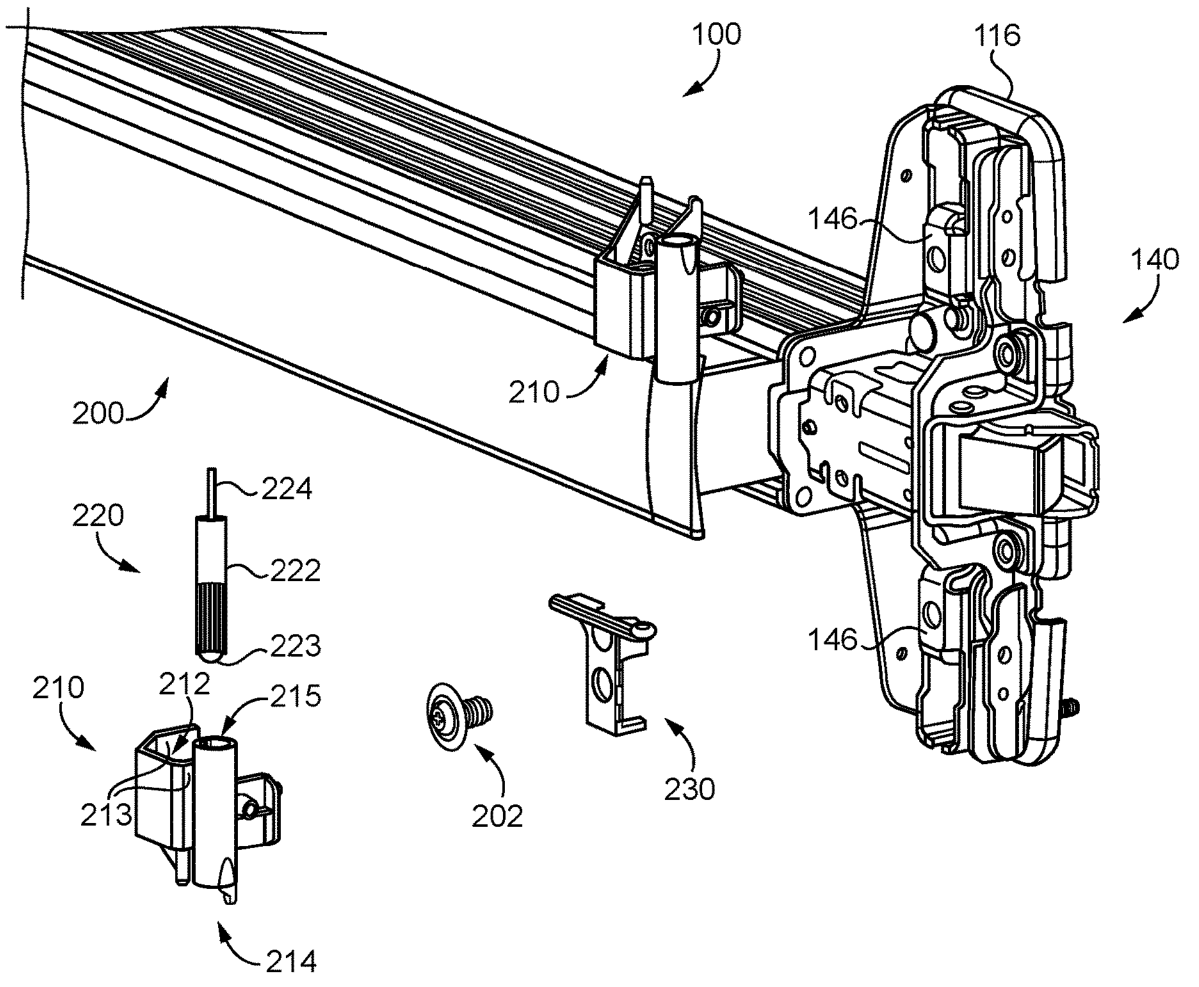
FIG. 5 is an illustration of the exit device along with a connector link damper assembly according to certain embodiments.
Figure 7:
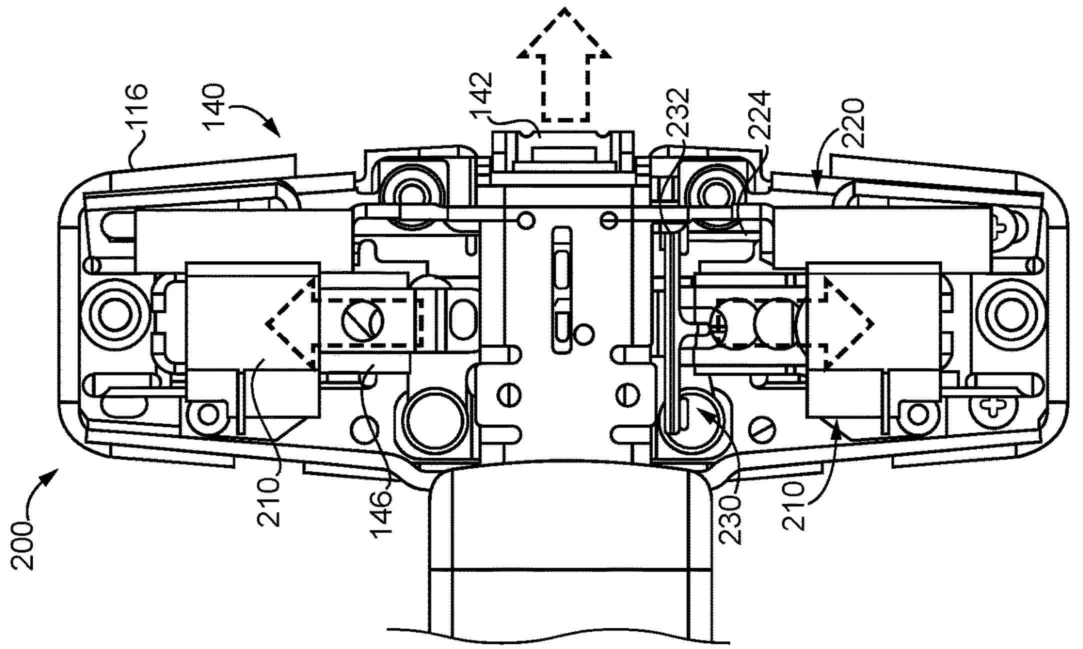
FIG. 7 illustrates the connector link damper assembly with the latchbolt assembly in a retracted state.
Figure 6:
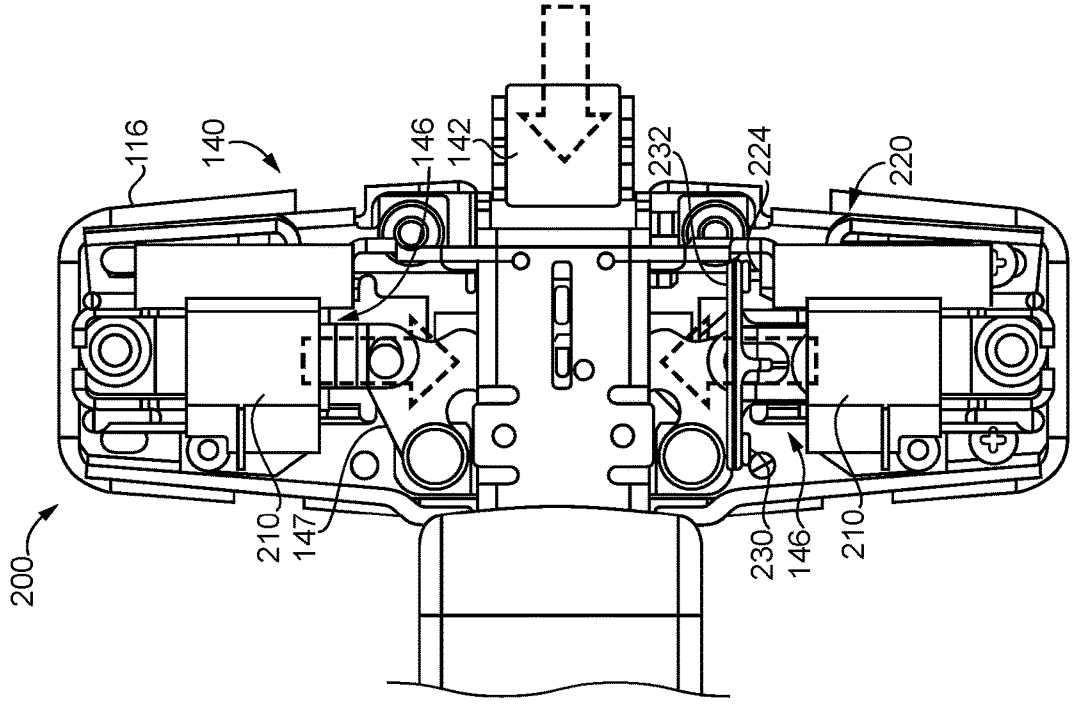
FIG. 6 illustrates the connector link damper assembly with the latchbolt assembly in an extended state.

FIGS. 5-7 illustrate a noise reduction mechanism in the form of a connector link damper assembly configured for use with the latch control assembly 140. The connector link damper assembly 200 includes a pair of housing brackets 210, a damper 220 mounted to one of the housing brackets 210, and a stop member 230 operable to engage the damper 220. As described herein, the damper 220 includes a body portion 222 and a plunger 224, and is configured to resist relative motion of the body portion 222 and plunger 224. The damper 220 may further include a bumper 223 made of a relatively soft material such as rubber in order to reduce vibrations and noise resulting from impact of the stop member 230 with the damper 220.

Each of the housing brackets 210 includes a guide channel 212 defined in part by a pair of sidewalls 213, and at least one of the brackets 210 includes a mounting feature 214 to which the damper 220 can be mounted. For example, the mounting feature 214 may include a tube 215 configured to receive the body portion 222 of the damper 220. Each housing bracket 210 is mounted to the header plate 116 adjacent a corresponding one of the connector links 146. The connector links 146 are at least partially received in the guide channels 212, which serve to guide the connector links 146 between the extended and retracted positions thereof. More specifically, the sidewalls 213 of each housing bracket 210 constrain the corresponding connector link 146 to movement along a guide path defined by guide channels 212. Constraining movement of the connector links 146 may reduce the amount of noise generated during operation of the latch control assembly 140, such as noise resulting from rattle and/or impact involving the connector links 146. Additionally, the sidewalls 213 may reduce or prevent metal-on-metal contact of the connector links 146 with other components, such as flanges of the header plate 116.

As noted above, the damper 220 includes a body portion 222 and a plunger 224 movably coupled to the body portion 222. The damper 220 is mounted to one of the housing brackets 210 via the mounting feature 214, such that the body portion 222 has a fixed position relative to the header plate 116. The plunger 224 has a projected position and a depressed position, and is biased toward the projected position, for example by a spring mounted within the body portion 222. The damper 220 is configured to resist movement of the plunger 224 from its projected position to its depressed position. Such movement of the plunger 224 may, for example, be resisted by the spring that biases the plunger 224 toward the projected position. In certain embodiments, the damper 220 may be provided as a fluid damper, and movement of the plunger 224 may further be resisted a fluid contained within the body portion 222.

The stop member 230 includes a stop wall 232, and is mounted to one of the connector links 146 such that the stop wall 230 is operable to engage the plunger 224 as the connector link 146 moves from its extended position toward its retracted position. The stop member 230 may be coupled to the connector link 146 by a fastener 202, such as a screw.

FIG. 6 illustrates the damper assembly 200 with the latch control assembly 140 in its deactuated or extended state. In this state, each of the control components 149 of the latch control assembly 140 is in its extended position. With the connector links 146 in the extended position, the stop wall 232 is engaged with the damper 220 such that the stop member 232 retains the plunger 224 in the depressed position. As the latch control assembly 140 transitions to the actuated state (FIG. 7), each of the control components 149 moves in its retracting direction. The retracting directions of the latchbolt 142 and the connector links 146 are illustrated in FIG. 6. As the connector links 146 move to the retracted position, the stop member 230 moves away from the damper 220, and the plunger 224 moves to its projected position.

FIG. 7 illustrates the damper assembly 200 with the latch control assembly 140 in its actuated or retracted state. In this state, the plunger 224 is in the projected position, and the free end of the plunger 224 is engaged with or positioned near the stop wall 232. When the latch control assembly 140 becomes free to return to its deactuated state, each of the control components 149 moves in its extending direction. The extending directions of the latchbolt 142 and the connector links 146 are illustrated in FIG. 7. As the connector links 146 move toward the extended positions thereof, the stop wall 232 engages the damper 220, and the stop member drives the plunger 224 to the depressed position. The damper 220 resists movement of the plunger 224 toward the depressed position, thereby reducing the speed of the connector link 146 and the other control components 149. By reducing the deactuation speed of the latch control assembly 140, the damper assembly 200 may reduce noise generated as the latch control assembly 140 returns to its extended state, such as noise resulting from contact between the control components 149 and other components. By way of example, the reduced deactuation speed may reduce noise generated as a result of the latchbolt 142 pivoting about the pivot pin 106 and/or impacting a portion of the strike 90.

As noted above, the drive rod damper assembly 160 slows movement of the drive assembly 120 from its actuated state to its deactuated state, and is therefore capable of slowing deactuation of the latch control assembly 140 during the drive assembly operational movement. However, when the drive assembly 120 remains in its deactuated state while the latch control assembly 140 transitions between its actuated and deactuated states, such as may occur during the relatching operational movement or the trim operational movement, the drive rod damper assembly 160 does not slow the deactuating movement of the latch control assembly 140.

In contrast to the drive rod damper assembly 160, the connector link damper assembly 200 is configured to slow the deactuating movement of the connector link 146, thereby slowing deactuating movement of the latch control assembly 140 regardless of the actuated/deactuated state of the drive assembly 120. As a result, the connector link damper assembly 200 is capable of slowing the deactuating movement of the latch control assembly 140 during each of the drive assembly operational movement, the relatching operational movement, and the trim operational movement. While the illustrated damper assembly 200 is configured to slow deactuation of the latch control assembly 140 by slowing deactuating movement of the connector link 146, it is also contemplated that a damper assembly may be configured to slow deactuation of the latch control assembly 140 by slowing deactuating movement of another component 149 of the latch control assembly 140, for example as described below with reference to FIGS. 8-10.

The stop 230 may be configured to engage the damper 220 for unidirectional force transmission in order to reduce the noise generated during deactuation without materially altering the operation of the latch control assembly 140 during actuation. In the illustrated embodiment, the stop member 230 is configured to abut the damper 220 such that the damper 220 and stop member 230 are capable of pushing one another, but cannot pull one another. Transmission of the pushing forces enables the damper 220 to resist movement of the stop 230 in the extending direction, thereby slowing the deactuating movement of the latch control assembly 140. Due to the fact that pulling forces are not transmitted, the damper 220 does not resist movement of the stop 230 in the retracting direction, and the actuation of the latch control assembly 140 is not inhibited. As a result, the amount of force that a user must exert to actuate the drive assembly 120 is not materially altered.

While the illustrated damper assembly 200 is arranged to slow deactuation of the latch control assembly 140 by providing for unidirectional transmission of pushing forces, it is also contemplated that the damper assembly 200 may be arranged to slow deactuation of the latch control assembly 140 by providing for unidirectional transmission of another type of force, such as pulling forces. In other embodiments, the stop 230 may be configured to engage the damper 220 for bidirectional transmission of forces, such that the damper assembly 200 reduces the movement speed of the latch control assembly 140 during both actuation and deactuation thereof.

Figure 8:
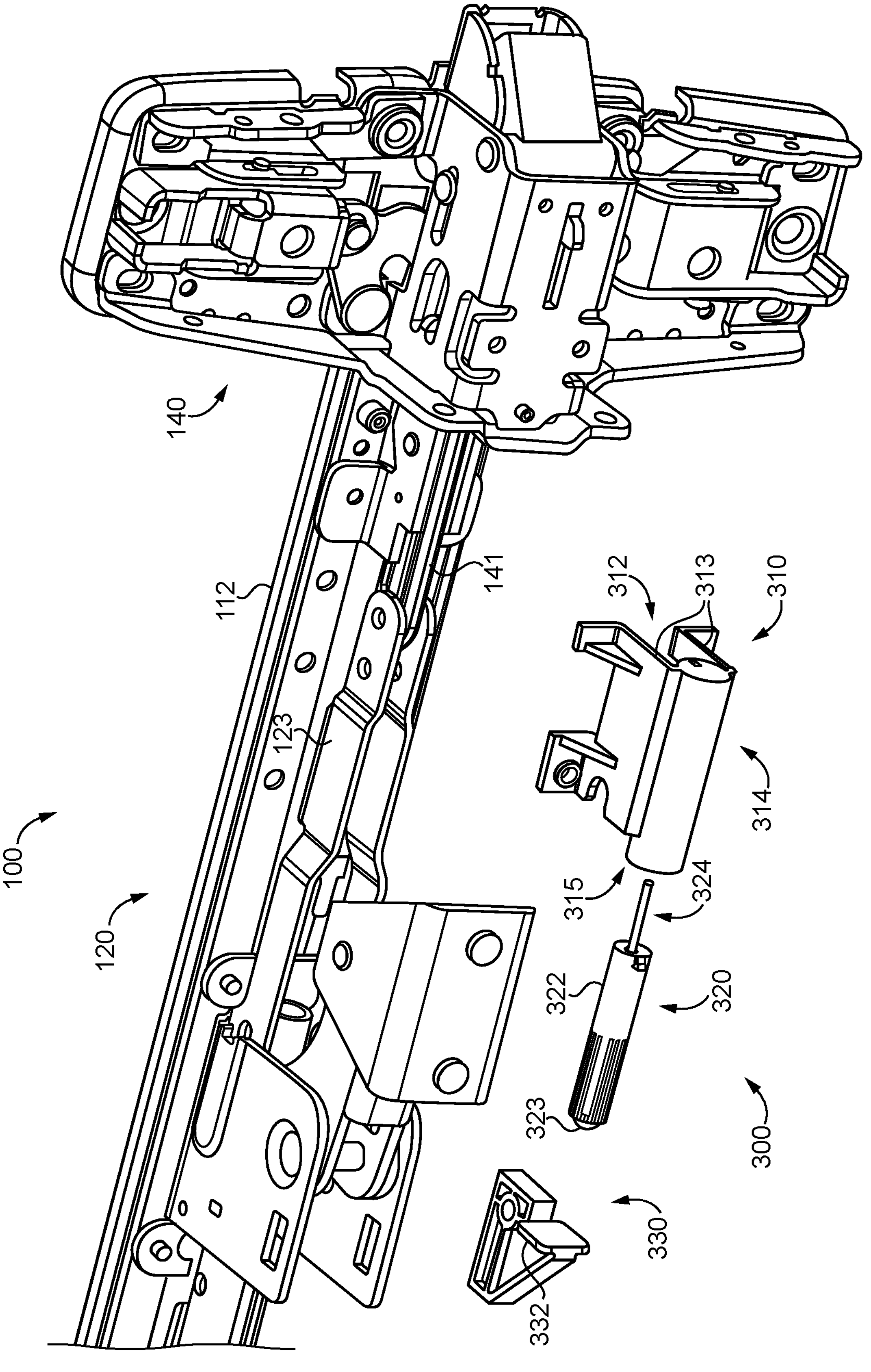
FIG. 8 is an illustration of the exit device along with a control link damper assembly according to certain embodiments.
Figure 10:
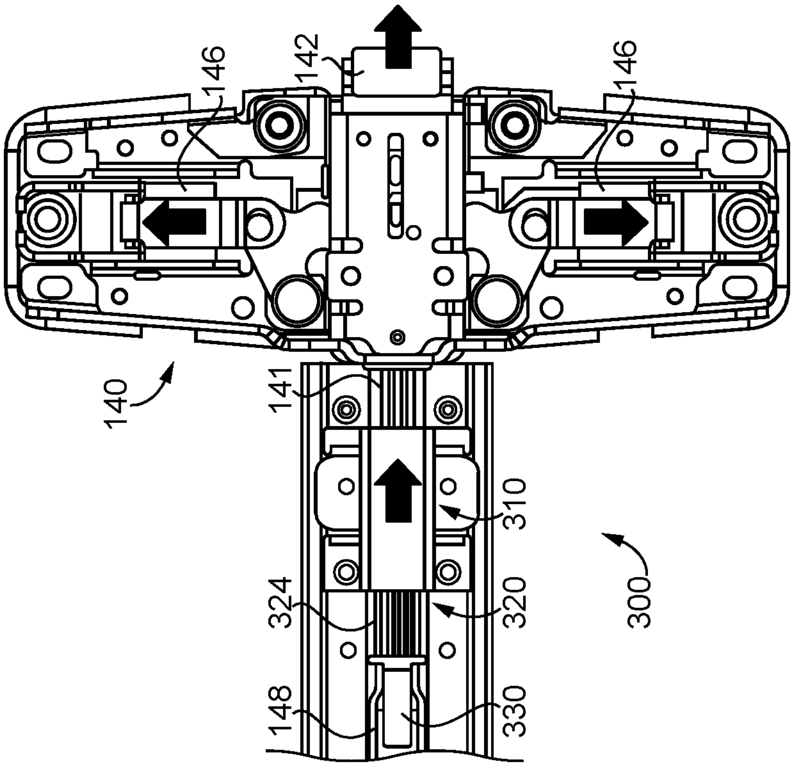
FIG. 10 illustrates the control link damper assembly with the latchbolt assembly in a retracted state.
Figure 9:
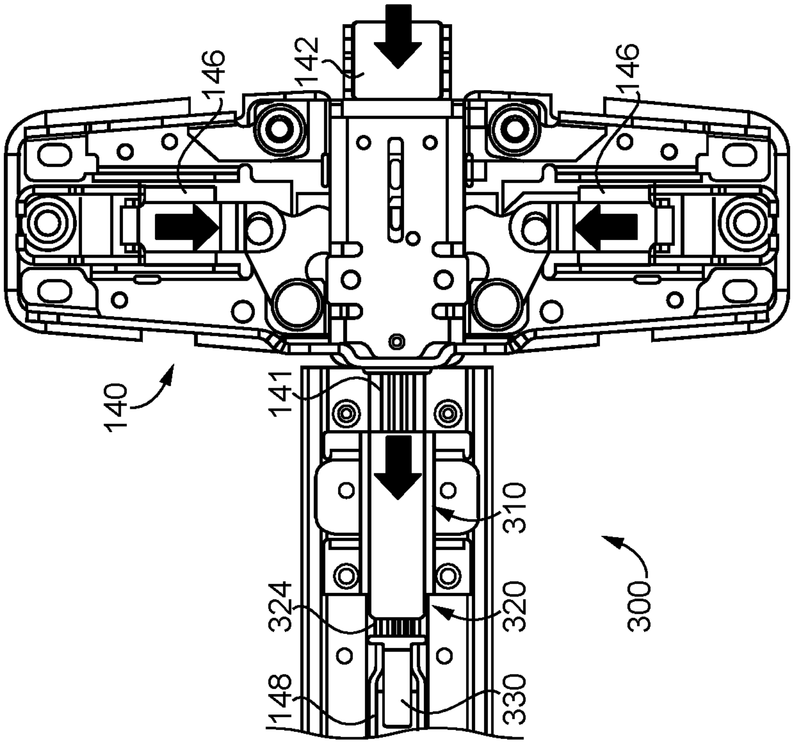
FIG. 9 illustrates the control link damper assembly with the latchbolt assembly in an extended state.

FIGS. 8-10 illustrate a noise reduction mechanism in the form of a control link damper assembly 300 configured for use with the latch control assembly 140. The control link damper assembly 300 is similar to the above-described connector link damper assembly 200, and similar reference characters are used to indicate similar elements and features. For example, the control link damper assembly 300 includes a housing bracket 310, a damper 320, and a stop member 330, which respectively correspond to the housing brackets 210, the damper 220, and the stop member 230 of the connector link damper assembly 200. In the interest of conciseness, the following description focuses primarily on features and functions of the control link damper assembly 300 that are different from those described above with reference to the connector link damper assembly 200.

The housing bracket 310 is mounted to the base plate 112 of the mounting assembly 110 such that the control link 141 extends through the guide channel 312. The damper 320 is mounted to the housing bracket 310 such that the body portion 322 has a fixed position relative to the base plate 112. The stop member 330 is mounted to the control link 141 and/or the fork link 148 on the distal side of the housing bracket 310. The stop wall 332 is operable to engage the damper 320 as the control link 141 moves between its extended and retracted positions.

FIG. 9 illustrates the damper assembly 300 with the latch control assembly 140 in the deactuated or extended state. In this state, the stop wall 332 is engaged with the damper 320 such that the stop member 330 retains the plunger 324 in the depressed position. As the latch control assembly 140 transitions to the actuated state (FIG. 10), each of the control components 149 moves in its retracting direction. The retracting directions of the latchbolt 142 and the connector links 146 are illustrated in FIG. 9. As the control link 141 moves to its retracted position, the stop member 330 moves away from the damper 320, thereby enabling the plunger 324 to move to its projected position.

FIG. 10 illustrates the damper assembly 300 with the latch control assembly 140 in the actuated or retracted state. In this state, the plunger 324 is in the projected position, and the free end of the plunger 324 is engaged with or positioned near the stop wall 332. When the latch control assembly 140 becomes free to return to its deactuated state, each of the control components 149 moves in its extending direction. The extending directions of the latchbolt 142 and the connector links 146 are illustrated in FIG. 10. As the control link 141 moves to its extended position, the stop wall 332 engages the damper 320 such that stop member 330 drives the plunger 324 to the depressed position. The damper 320 resists movement of the plunger 324 toward its depressed position, thereby reducing the speed of the control link 141 and the other control components 149.

By reducing the deactuation speed of the latch control assembly 140, the damper assembly 300 may reduce noise generated by such deactuation in a manner similar to that described above with reference to the connector link damper assembly 200. Additionally, the stop member 330 may be configured to engage the damper 320 for transmission of forces in manners analogous to those described above with reference to the illustrated and alternative forms of the damper 220 and stop member 230 of the connector link damper assembly 200.

Figure 11:
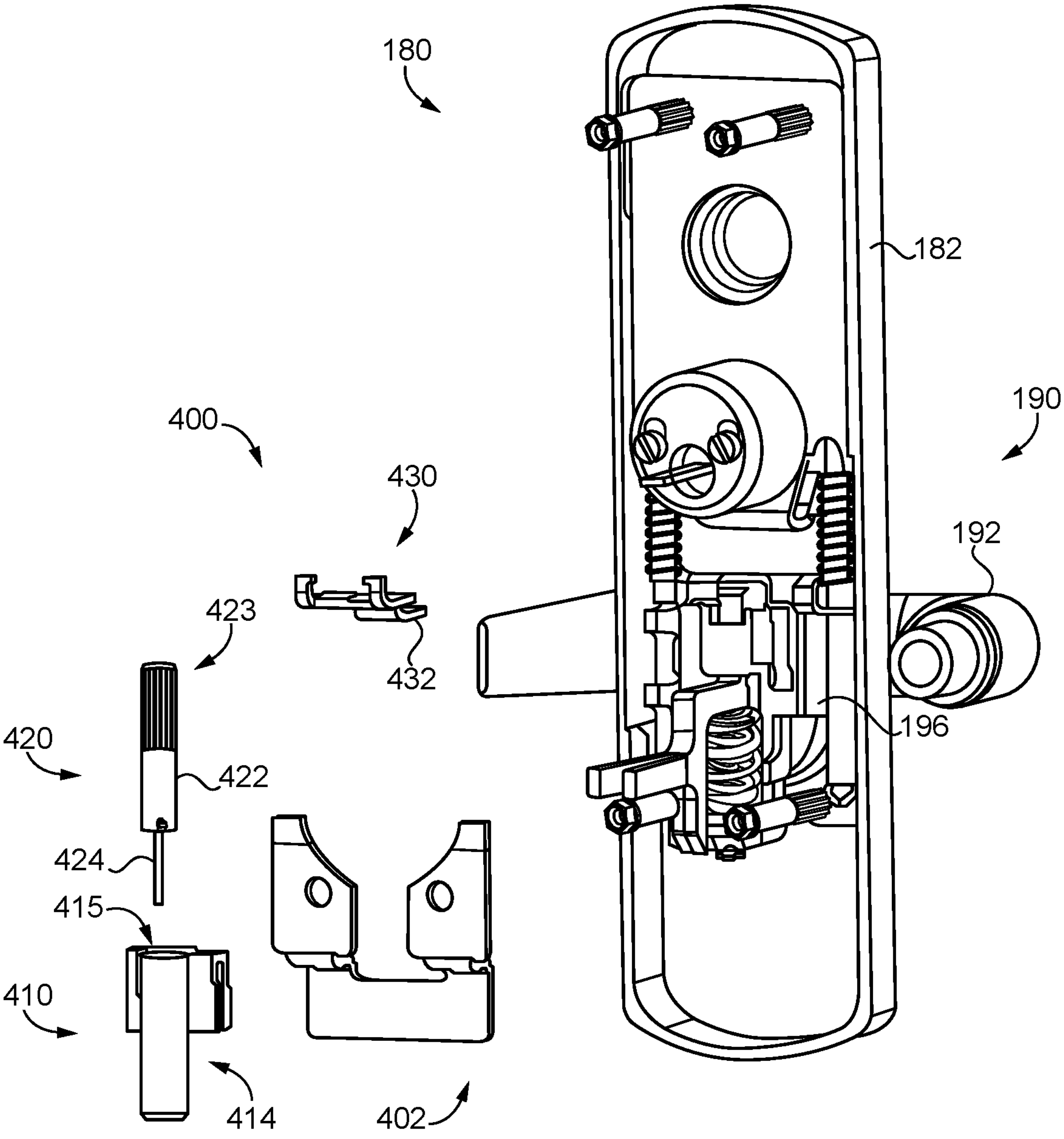
FIG. 11 is an illustration of the trim assembly along with a trim damper assembly according to certain embodiments.
Figure 13:
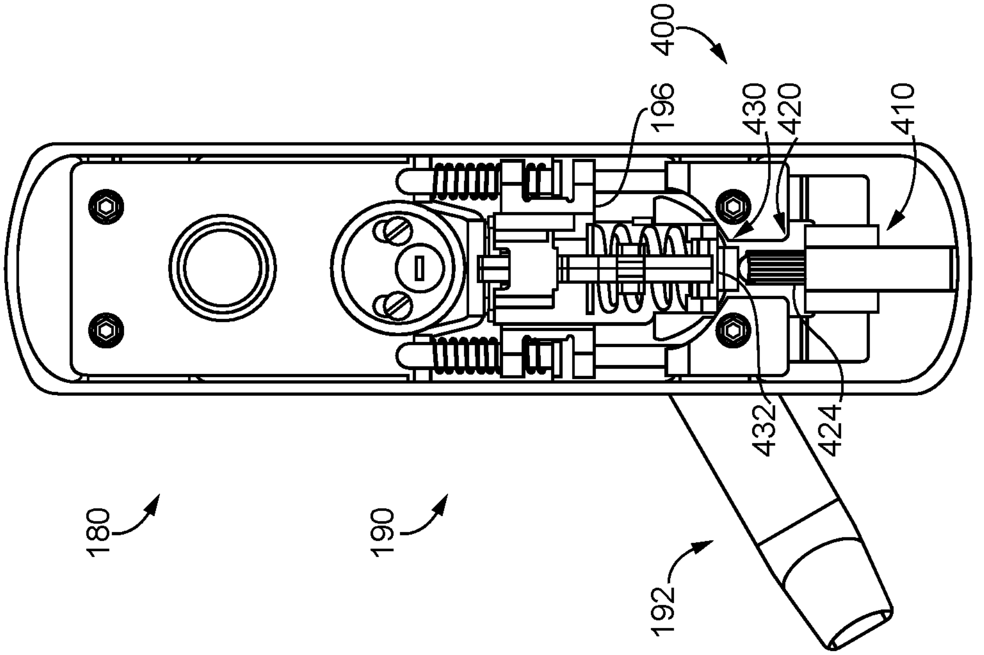
FIG. 13 illustrates the trim damper assembly with the trim assembly in an actuated state.
Figure 12:
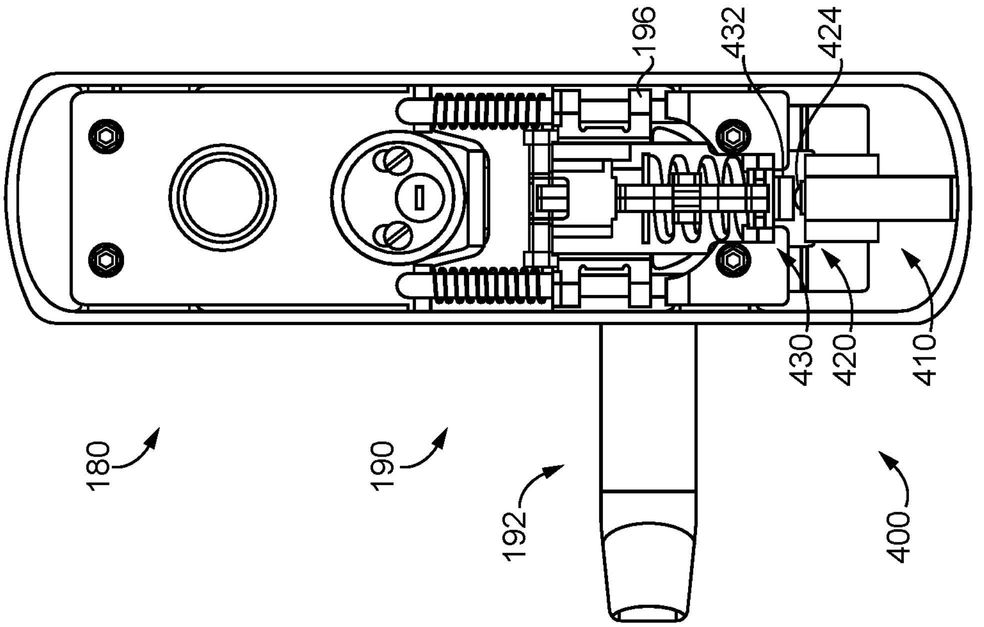
FIG. 12 illustrates the trim damper assembly with the trim assembly in a deactuated state.

FIGS. 11-13 illustrate a noise reduction mechanism in the form of a trim damper assembly 400 configured to reduce noise generated during operation of the trim assembly 180. The trim damper assembly 400 is similar to the above-described connector link damper assembly 200, and similar reference characters are used to indicate similar elements and features. For example, the control link damper assembly 400 includes a housing bracket 410, a damper 420, and a stop member 430, which respectively correspond to the housing brackets 210, the damper 220, and the stop member 230 of the connector link damper assembly 200. In the interest of conciseness, the following description focuses primarily on features and functions of the control link damper assembly 400 that are different from those described above with reference to the connector link damper assembly 200.

The trim damper assembly 400 includes a base plate 402, which is substantially similar to the lower base plate 186 of the trim assembly 180. The base plate 402 is mounted to the escutcheon 182, and the housing bracket 410 is mounted to the base plate 402. The damper 420 is mounted to the housing bracket 410, and the stop member 430 is mounted to the slide plate 196 such that the stop member 430 is operable to engage the damper 420 during movement of the slide plate 196. With the damper assembly 400 installed to the trim assembly 180, the stop member 430 sits over the edge of the slide plate 196, and may be held in place by one or more fasteners. While other forms are contemplated, the illustrated stop member 430 is coupled to the slide plate 196 may a pair of hook features and a plastic rivet.

In certain embodiments, the trim damper assembly 400 may be provided in the form of a retrofit kit for an existing trim assembly 180. In such a kit, the damper 420 may be premounted to the housing bracket 410, for example via mating snap features, and the base plate 402 may be configured to replace the existing lower base plate 186. Replacing the existing base plate 186 may, for example, involve removing the standoffs 187 from the existing base plate 186, and mounting the standoffs 187 to the new base plate 402.

FIG. 12 illustrates the trim damper assembly 400 with the trim assembly 180 in a deactuated state, in which the handle 192 in the home position. In this state, the slide plate 196 is retained in its deactuated position by the biasing springs 189. With the slide plate 196 in the deactuated position, the stop member 430 is engaged with the damper 420 and retains the plunger 424 in the depressed position. When the handle 192 is rotated, the actuating assembly 190 transitions to the actuated state illustrated in FIG. 13. As the handle 192 is rotated, the cam 194 drives the slide plate 196 to the actuated position, the stop member 430 moves away from the damper 420, and the plunger 424 moves to its projected position.

FIG. 13 illustrates the trim damper assembly 400 with the trim assembly 180 in an actuated state, in which the handle 192 is in a rotated position. In this state, the plunger 424 is in the projected position, and the free end of the plunger 424 is engaged with or positioned adjacent the stop wall 432. As the actuating assembly 190 returns to the deactuated state, the slide plate 196 moves toward its deactuated position, and the stop member 430 drives the plunger 424 to the depressed position. The damper 420 resists movement of the plunger

424 toward the depressed position, thereby reducing the speed of the slide plate 196 and other components of the actuating assembly 190. By reducing the deactuation speed of the actuating assembly 190, the damper assembly 400 may reduce noise generated as the actuating assembly 190 returns to the deactuated state, such as noise resulting from one or more components of the actuating assembly 190 impacting other components.

As will be appreciated, the trim damper assembly 400 is configured to slow the deactuating movement of the slide plate 196, thereby slowing deactuating movement of the actuating assembly 190 regardless of the actuated/deactuated state of the drive assembly 120 and latch control assembly 140. As a result, the trim damper assembly 400 is capable of slowing the deactuating movement of the trim assembly 180 during the trim operational movement. While the illustrated trim damper assembly 400 is configured to slow deactuation of the trim assembly 180 by slowing deactuating movement of the slide plate 196, it is also contemplated that a damper assembly may be configured to slow deactuation of the trim assembly 180 by slowing deactuating movement of another component of the actuating assembly 190.

The stop member 430 may be configured to engage the damper 420 for unidirectional force transmission in order to reduce the deactuation speed actuating assembly 190 without materially altering the operation of the actuating assembly 190 during actuation. In the illustrated embodiment, the stop member 430 is configured to abut the damper 420 such that the damper 420 and stop member 430 are capable of pushing one another, but cannot pull one another. Transmission of the pushing forces enables the damper 420 to resist movement of the stop member 430 in the extending direction, thereby slowing the deactuating movement of the actuating assembly 190. Due to the fact that pulling forces are not transmitted, the damper 420 does not resist movement of the stop member 430 in the retracting direction, and movement of the actuating assembly 190 during actuation is not hindered. As a result, the amount of force that a user must exert to rotate the handle 192 for actuation of the actuating assembly 190 is not materially altered.

While the illustrated damper assembly 400 is arranged to slow deactuation of the actuating assembly 190 by providing for unidirectional transmission of pushing forces, it is also contemplated that the damper assembly 400 may be arranged to slow deactuation of the actuating assembly 190 by providing for unidirectional transmission of another type of force, such as pulling forces. In other embodiments, the stop member 430 may be configured to engage the damper 420 for bidirectional transmission of forces, such that the damper assembly 400 reduces the movement speed of the actuating assembly 190 during both actuation and deactuation.

In light of the foregoing descriptions, it is evident that each of the noise reduction mechanisms 200, 300, 400 is configured to reduce noise generation by controlling the deactuating speed of the latch control assembly 140. In contrast to the drive rod damper assembly 160, which at best may slow deactuation of the latch control assembly 140 during the drive assembly operational movement (including free release of the drive assembly 120), each of the noise reduction mechanisms 200, 300, 400 is also operable to slow deactuation of the latch control assembly 140 during the relatching operational movement (including extension of the latchbolt 142 after clearing the strike 90) and/or the trim assembly operational movement (including free release of the handle 192).

In the illustrated embodiments, each of the noise reduction mechanisms 200, 300, 400 includes a damper 220, 320, 420. It is also contemplated that one or more of the noise reduction mechanisms 200, 300, 400 may control the deactuation speed of the latch control assembly 140 using additional or alternative components operable to provide resistive forces, such as magnets and/or springs. In certain forms, one or more of the noise reduction mechanisms may include an adjustment mechanism by which the level of resistance may be adjusted. For example, in embodiments in which the resistive force is provided by a fluid damper, the adjustment mechanism may include a valve operable to adjust the effective cross-sectional area of an opening through which the fluid flows.

As indicated above, each of the noise reduction mechanisms 200, 300, 400 is configured to control the deactuating speed of the latch control assembly 140, thereby reducing vibrations resulting from contact between components (e.g., vibrations resulting from impact and/or sliding engagement). The noise reduction mechanisms 200, 300, 400 may further reduce noise generation in other manners, such as by reducing rattling and/or the amount of metal-to-metal contact between moving components. Further examples of noise reduction mechanisms that may reduce vibrations resulting from contact between moving components will now be described with reference to FIGS. 14-24.

Figure 14:
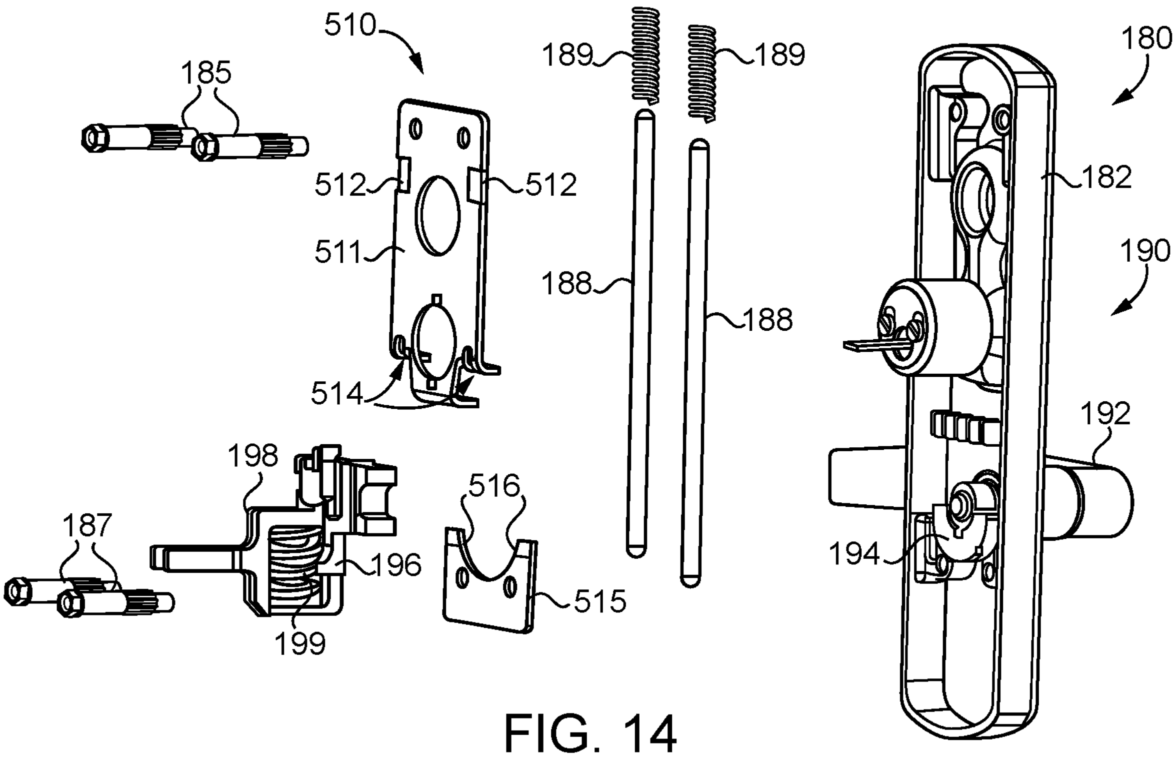
FIG. 14 is an illustration of the trim assembly along with a holder plate according to certain embodiments.
Figure 15:
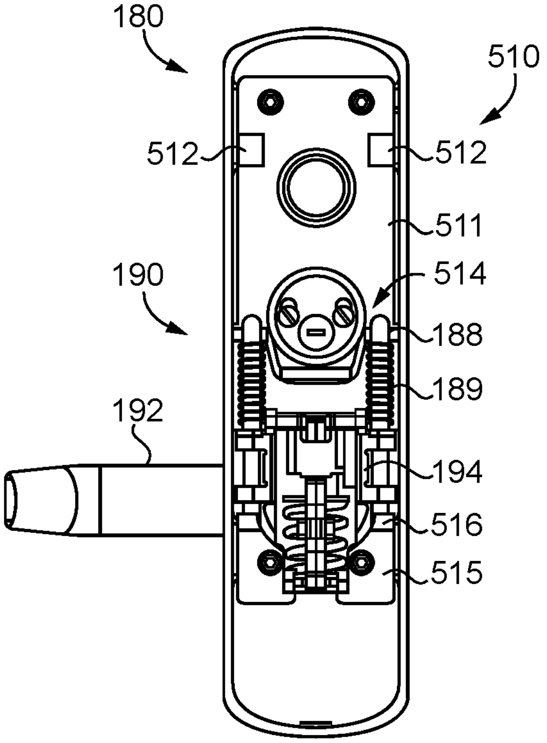
FIG. 15 illustrates the trim assembly with the holder plate installed.

FIGS. 14 and 15 illustrate a noise reduction mechanism in the form of a holder plate assembly 510 configured to reduce noise generated during operation of the trim assembly 180. The holder plate assembly 510 includes an upper plate 511 and a lower plate 515, which are substantially similar to the upper base plate 184 and the lower base plate 186, respectively. In certain forms, the holder plate assembly 510 may be provided in a retrofit kit configured for use with the trim assembly 180. Retrofitting the trim assembly 180 may, for example, involve removing the standoffs 185, 187 from the existing base plates 184, 186 and mounting the standoffs 185, 187 to corresponding locations on the new plates 511, 515. In certain embodiments, the holder plate assembly 510 may be used in combination with the above-described trim damper assembly 400.

In the unmodified trim assembly 180, the guide rods 188 are mounted to the base plates 184, 186 with loose clearance fits. While the clearance fits can improve ease of manufacture and assembly, it has been found that clearance fits may also lead to undesired rattling during operation of the actuating assembly 190. To address this issue, the upper plate 511 includes a pair of spring tabs 512, and the lower plate 515 includes a similar pair of spring tabs 516. With the holder plate assembly 510 assembled to the trim assembly 180, the rods 188 extend through openings 514 of the upper plate 511. Additionally, the spring tabs 512, 516 resiliently engage the end portions of the guide rods 188, thereby holding the guide rods 188 in place and reducing rattling during operation of the actuating assembly 190. The spring tabs 512, 516 may also reduce undesired movement of the slide plate 196, thereby further reducing the noise generated by the trim assembly 180.

Figure 17:
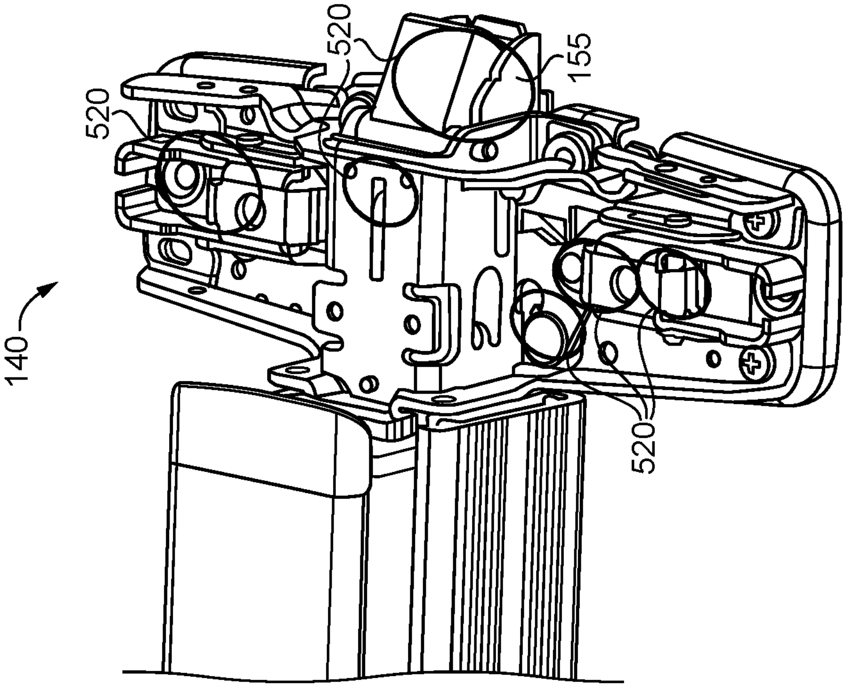
FIGS. 16 and 17 illustrate the latchbolt assembly with damping grease applied according to certain embodiments.
Figure 16:
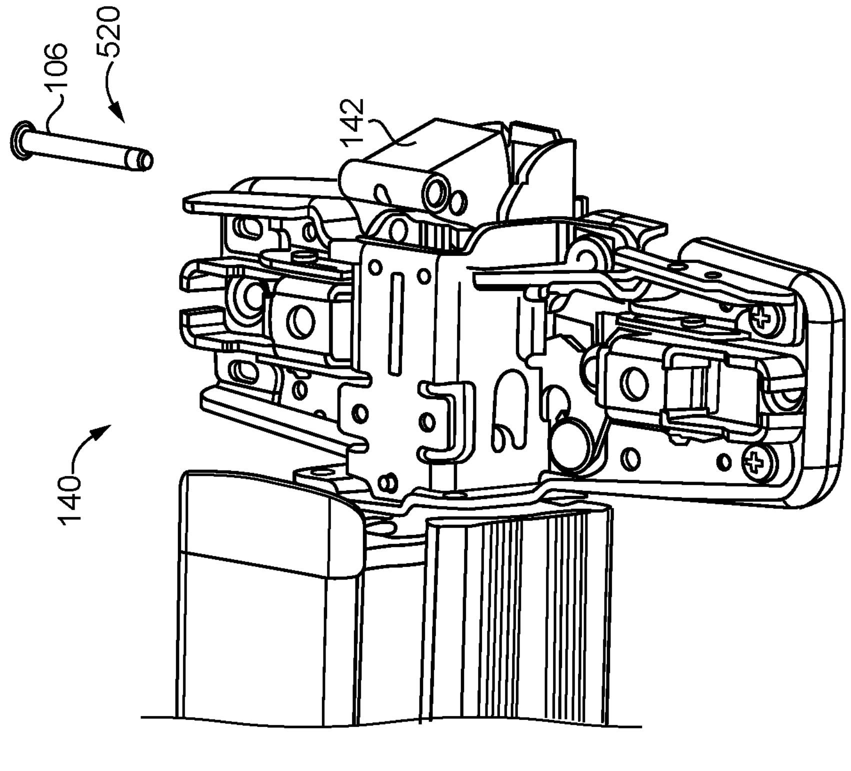
Figure 18:
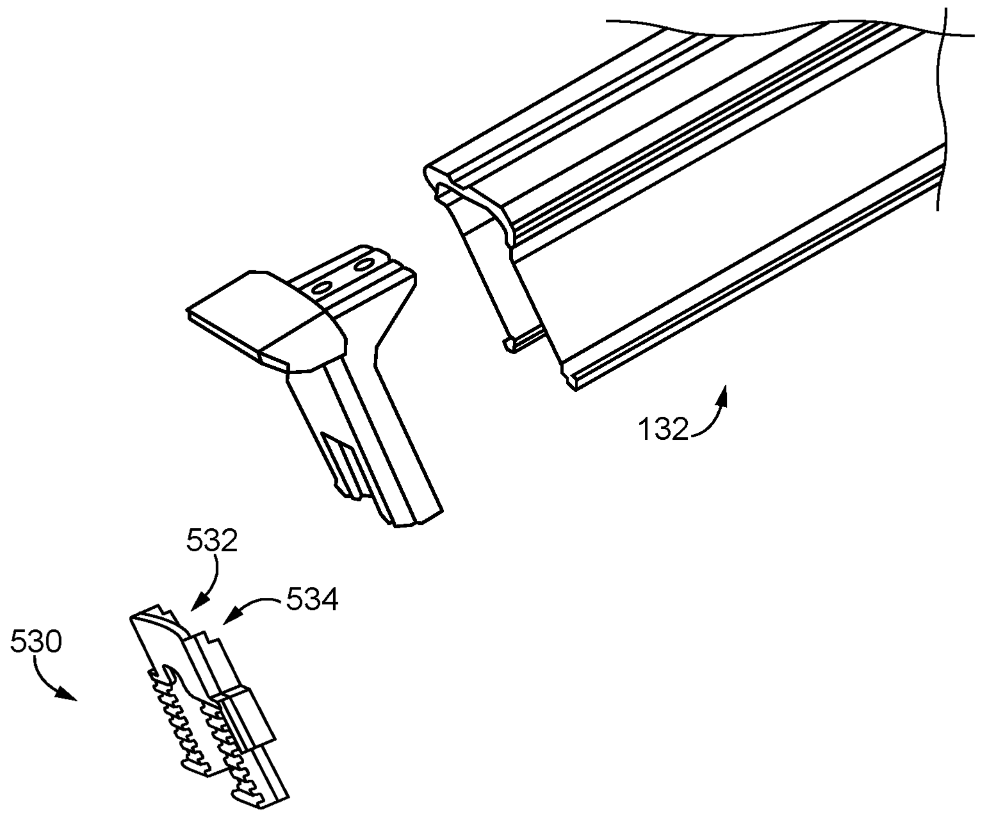
FIG. 18 is an illustration of a pushbar of the exit device along with a pushbar guide according to certain embodiments.

FIGS. 16 and 17 illustrate the latch control assembly 140 with a noise reduction mechanism in the form of damping grease 520. When applied between two relatively movable components, the damping grease 520 provides for slower and smoother relative motion of the components, and may serve to decrease rattling of the components. In the illustrated embodiment, the pivot pin 106 is coated in the damping grease 520, thereby slowing the motion of the latchbolt 142 and reducing the generation of noise. The damping grease 520 may also be applied to other moving parts of the exit device 100. For example, FIG. 18 illustrates several examples of locations at which the damping grease 520 may be applied to the latch control assembly 140. Applying the damping grease 520 to these and other locations may slow movement of the latch control assembly 140 and reduce or eliminate rattling between loose-fitting mating parts. When so applied, the damping grease 520 may greatly reduce the sound coming from within the header case 117 during operation of the latch control assembly 140.

Figure 19:
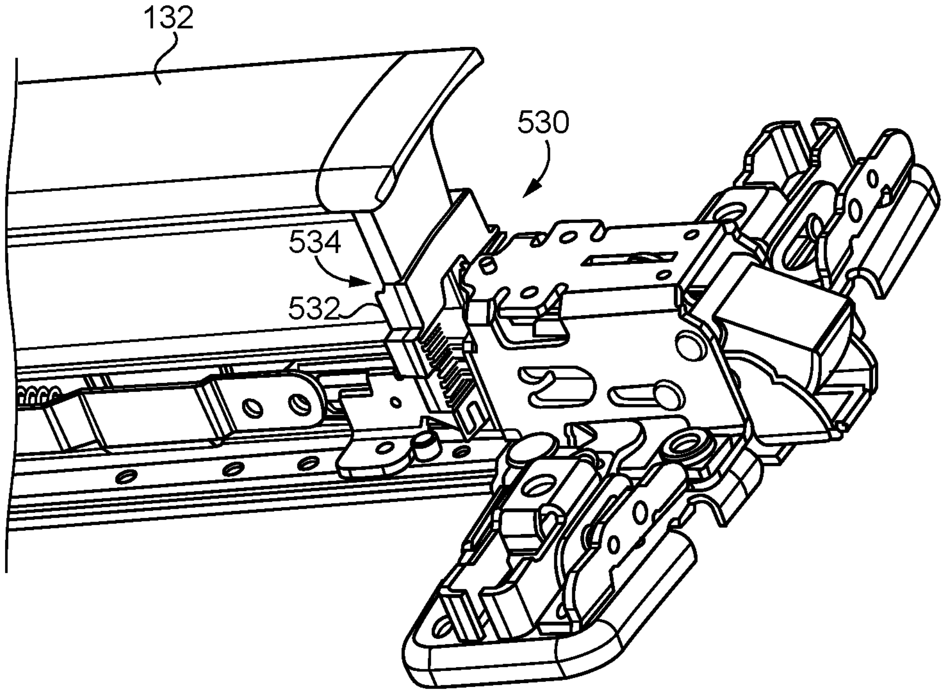
FIG. 19 illustrates the exit device and pushbar guide with the pushbar in an extended position.
Figure 20:
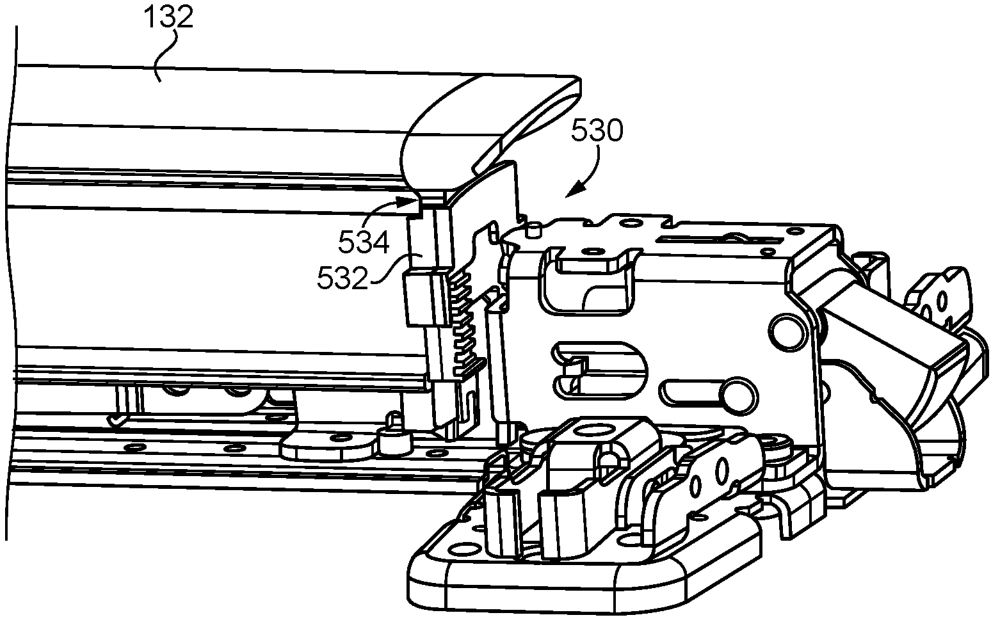
FIG. 20 illustrates the exit device and pushbar guide with the pushbar in a depressed position.

FIGS. 18-20 illustrate a noise reduction mechanism in the form of a pushbar guide 530 configured to reduce noise generated by impact of the pushbar 132 on the header case 117. The pushbar guide 530 is configured to be mounted to the channel member 111 adjacent the proximal end of the pushbar 132. The pushbar guide 530 includes a lip 532 that extends around the proximal end portion of the pushbar 132 and acts as a barrier between the pushbar 132 and the header case 116. The lip 532 may include a cutout 534 that facilitates movement of the pushbar 132 to its fully depressed position (FIG. 20).

The pushbar guide 530 is formed of a material having a lower hardness than the metal of which the header case 116 and pushbar 132 are formed, such as a plastic material. In discouraging metal-to-metal contact of the header case 116 and pushbar 132, the pushbar guide 530 may reduce noise generation during operation of the exit device 100. The lip 532 may also retain the position of the guide 530 during assembly, thereby facilitating such assembly.

Figure 21:
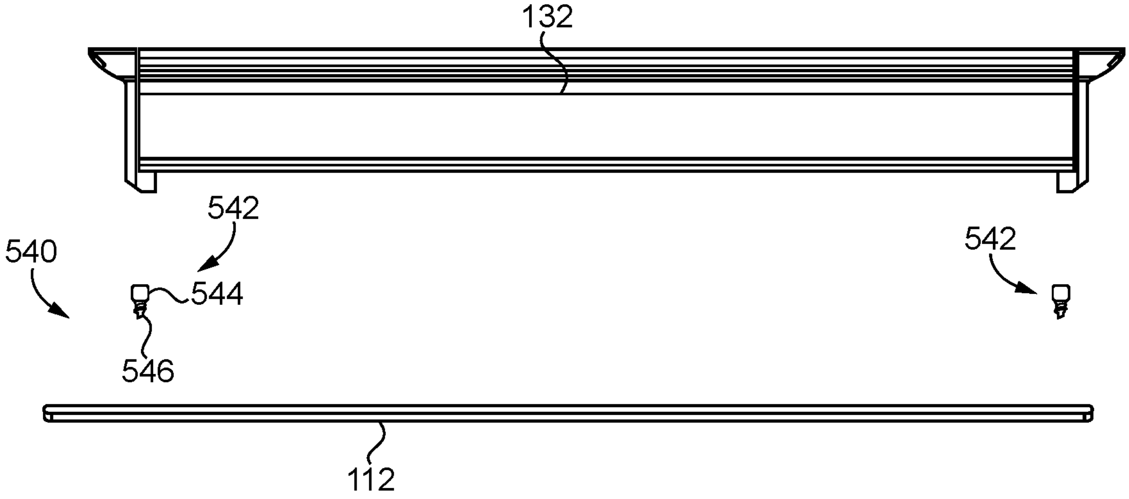
FIG. 21 is an illustration of the pushbar along with a mounting plate bumpstop assembly according to certain embodiments.
Figure 22:
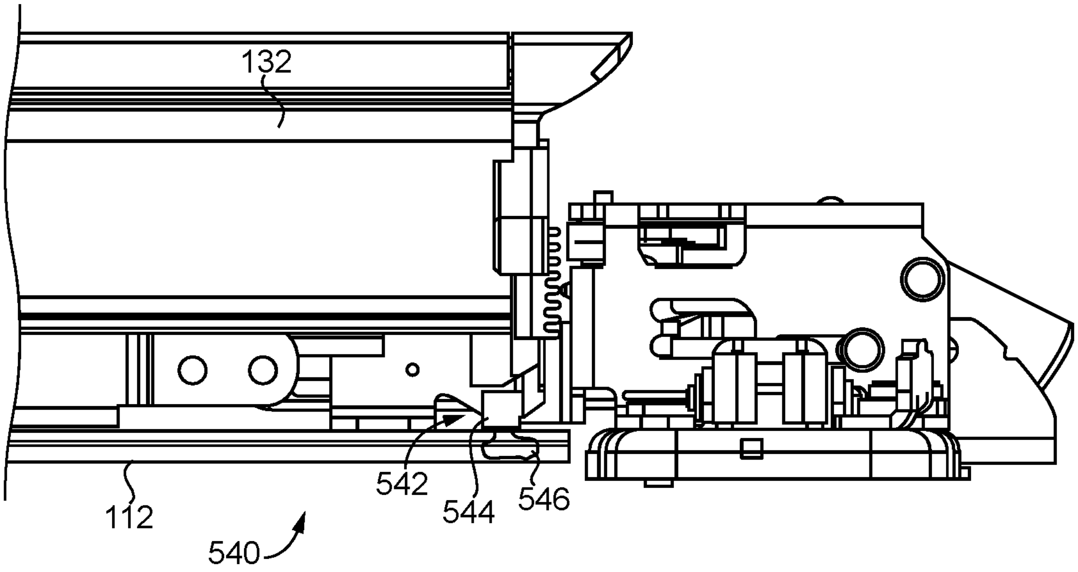
FIG. 22 illustrates the exit device and the mounting plate bumpstop assembly with the pushbar in a depressed position.

FIGS. 21 and 22 illustrate a noise reduction mechanism in the form of a mounting plate bumpstop assembly 540 configured to reduce noise generated by impact of the pushbar 132 on the base plate 112. The bumpstop assembly 540 includes a plurality of bumpers 542, each of which includes a pad 544 and a stem 546. The bumpers 542 may be mounted to the base plate 112 by inserting each of the stems 546 into a corresponding opening in the base plate 112 that matingly receives the stem 546. With the bumpers installed to the base plate 112, the pads 544 are aligned with the edges of the pushbar 132. As the pushbar 132 approaches the fully depressed position (FIG. 22), the edges of the pushbar engage the pads 544. The bumpers 542 are formed of a material with a relatively low hardness rating, such as a rubber or elastic material. As a result, the pads 544 flex or deform when engaged by the edges of the pushbar 132, thereby dampening vibrations and reducing noise generation. The bumpers 542 may be configured to engage the pushbar 132 when the pushbar 132 is a predetermined distance from the fully depressed position, and to flex or deform as the pushbar travels through the predetermined distance to the fully depressed position. The predetermined distance may, for example, be approximately 0.1 inches, such as within a range of 0.085 inches to 0.115 inches.

The bumpers 542 may be configured to replace existing bumpers of the exit device 100. For example, the illustrated bumpstop assembly 540 includes four bumpers 542 that are configured to replace four existing bumpers that are mounted to the base plate 112 of the exit device 100. The existing bumpers of the exit device 100 are formed of a relatively hard material. As a result, the existing bumpers transmit impact energy to the mounting assembly 110, which may cause rattling and vibration within the exit device 100 or of the door 84 itself. The bumpers 542 of the bumpstop assembly 540 have a lower hardness rating than the existing bumpers, and therefore are capable of absorbing at least some of the impact energy that would otherwise cause undesirable rattling and vibration. In addition to the softer material, the bumpers 542 may be provided with a greater height and/or a greater diameter than the existing bumpers, which may further increase the energy absorption provided by the bumpstop assembly 540.

Figure 23:
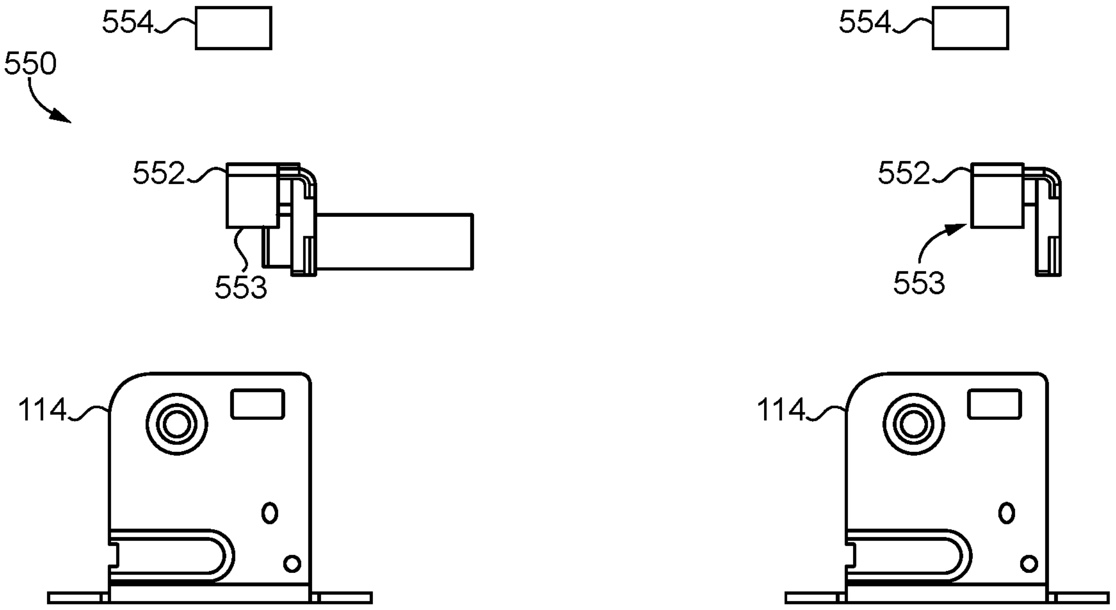
FIG. 23 is an illustration of a portion of the exit device with a mounting bracket bumpstop assembly according to certain embodiments.
Figure 24:
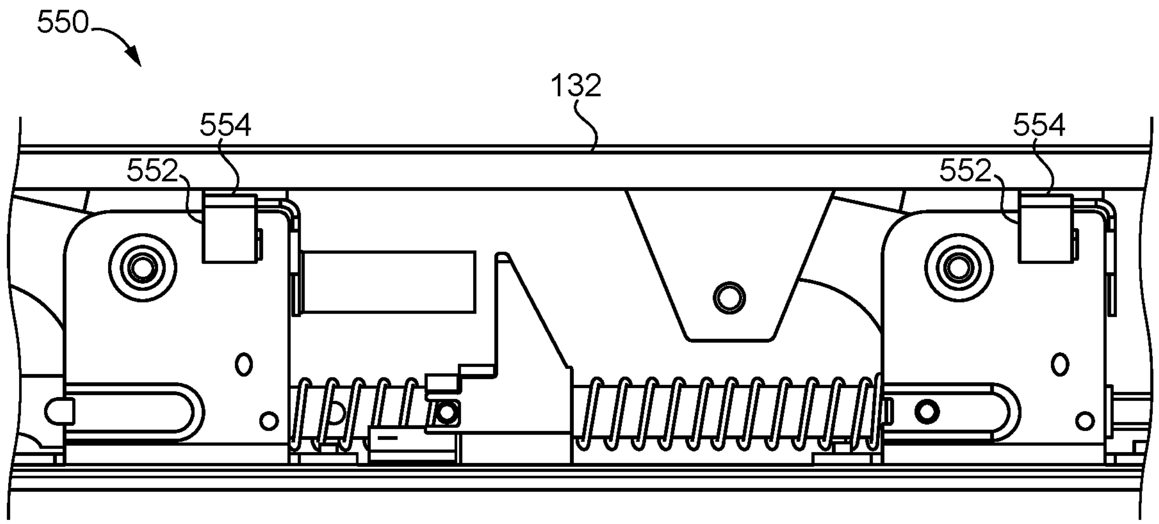
FIG. 24 illustrates the exit device and the mounting bracket bumpstop assembly with the pushbar in a depressed position.

FIGS. 23 and 24 illustrate a noise reduction mechanism in the form of a bell crank bracket bumpstop assembly 550 configured to reduce noise generated by impact of the pushbar 132 on the bell crank brackets 114 of the mounting assembly 110. The bumpstop assembly 550 includes a pair of housing brackets 552, each of which has a pad 554 mounted thereon. The housing brackets 552 are configured for mounting to the bell crank brackets 114. For example, the housing brackets 552 may include snap features 553 that engage openings in the bell crank brackets 114. The pads 554 are formed of a soft material operable to absorb impact energy and vibrations. As the pushbar 132 approaches the fully depressed position (FIG. 24), the underside of the pushbar 132 comes into contact with the pads 554. The pads 554 absorb the mechanical impact energy, thereby reducing noise generation.

While other forms are contemplated, the illustrated pads 554 are formed of a foam, such as a microcell foam. The pads 554 may be mounted to the housing brackets 552 via an adhesive, such as a double-sided adhesive tape. In certain forms, the pads 554 may be provided with an adhesive side that is coated with a protective film. In such forms, installation of the bumpstop assembly 550 may include removing the protective film and placing the adhesive side of each pad 554 in contact with the appropriate surface of the housing bracket 552.

Figure 25:
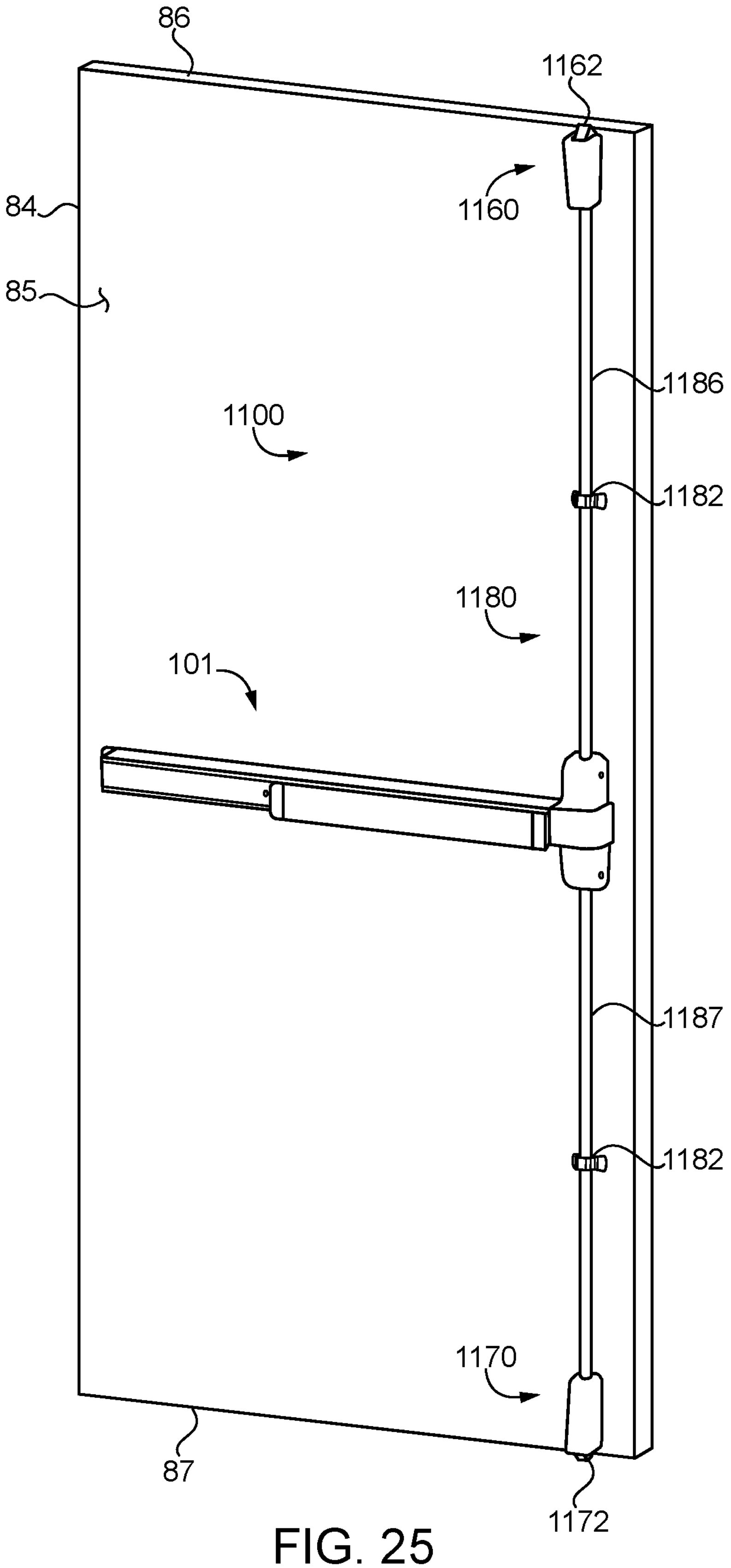
FIG. 25 is an illustration of another form of exit device installed to a door.

With reference to FIG. 25, illustrated therein is an exit device 1100 that may be utilized in connection with certain embodiments. The exit device 1100 includes the pushbar assembly 101 illustrated in FIG. 1, and further includes a remote latching assembly 1150 of the type commonly referred to as a surface vertical rods (SVR) remote latching assembly. In the illustrated form, the remote latching assembly 1150 may be considered to constitute a portion of the latch control assembly 140. While above-described the latchbolt 142 is omitted in the illustrated embodiment, it is also contemplated that the latch control assembly 140 may include both the remote latching assembly 1150 and a latchbolt of the type illustrated in FIGS. 1-3.

The remote latching assembly 1150 is mounted to the interior side surface 85 of the door 84, and generally includes an upper latching mechanism 1160 mounted adjacent the upper edge 86 of the door 84, a lower latching mechanism 1170 mounted adjacent the lower edge 87 of the door 84, and a connection assembly 1180 extending between the pushbar assembly 101 and the upper and lower latching mechanisms 1160, 1170. As described herein, the connection assembly 1180 operably connects the pushbar assembly 101 with the upper and lower latching mechanisms 1160, 1170 such that actuation of the pushbar assembly 101 causes a corresponding actuation of the latching mechanisms 1160, 1170.

The upper latching mechanism 1160 includes an upper latchbolt 1162, and the lower latching mechanism 1170 includes a lower latchbolt 1172. The upper latchbolt 1162 has an upward extended position in which the latchbolt 1162 extends above the top edge 86 and is operable to engage a strike on the upper jamb of the frame, and a downward retracted position in which the latchbolt 1162 is disengaged from upper jamb. Similarly, the lower latch bolt 1172 has a downward extended position in which the latchbolt 1172 extends below the bottom edge 87 and is operable to engage a pocket in the floor, and an upward retracted position in which the latchbolt 1172 is disengaged from the floor. Thus, each of the latchbolts 1162, 1172 has a laterally-outward extended position in which the latchbolt 1162/1172 is operable to engage the frame to retain the door 84 in the closed position, and a laterally-inward retracted position in which the latchbolt 1162/1172 is disengaged from the frame and does not prevent the door 84 from being opened. One or both of the latching mechanisms 1160, 1170 includes a biasing member urging the respective latchbolt 1162/1172 to the extended position thereof.

The connection assembly 1180 generally includes an upper rod 1186 and a lower rod 1187, each of which is rigid. Each of the rods 1186, 1187 is slidably mounted for movement in the vertical lateral directions, and guide brackets 1182 aid in constraining the rods 1186, 1187 to movement in the lateral directions. Each of the rods 1186, 1187 is connected between the pushbar assembly 101 and a corresponding one of the latching mechanisms 1160, 1170 such that actuation of the drive assembly 120 causes a corresponding actuation of the remote latching assembly 1150. More specifically, the laterally inward end of each rod 1186, 1187 is connected to a corresponding one of the retractor links 146, and the laterally outward end of each rod 1186, 1187 is connected to a corresponding one of the latching mechanisms 1160, 1170.

During operation of the exit device 1100, actuation of the drive assembly 120 causes a corresponding actuation of the latch control assembly 140 in the manner described above. This actuation of the latch control assembly 140 drives the retractor links 146 laterally inward (i.e., toward one another), thereby causing a corresponding laterally inward movement of the rods 1186, 1187. The laterally inward movement of the rods 1186, 1187 actuates the latching mechanisms 1160, 1170, thereby driving the latchbolts 1162, 1172 to the retracted positions against the biasing forces urging the latchbolts 152, 1172 to the extended positions thereof. When the drive assembly 120 is subsequently released, the latch control assembly 140 becomes free to move toward its deactuated state. The biasing members of the latching mechanisms 1160, 1170 urge the latchbolts 1162, 1172 and the rods 1186, 1187 laterally outward, thereby driving the retractor links 146 laterally outward and deactuating the latch control assembly 140.

The deactuating movement of the latch control assembly 140 may be slowed by one or more of the above-described noise reduction mechanisms, such as the control link damper assembly 300 illustrated in FIGS. 8-10. Additionally or alternatively, the deactuating movement of the latch control assembly 140 may be slowed by another form of noise reduction mechanism, such as a noise reduction mechanism that slows the deactuating movement of the remote latching assembly 1150. Two examples of such SVR damper assemblies will now be provided.

Figure 26:
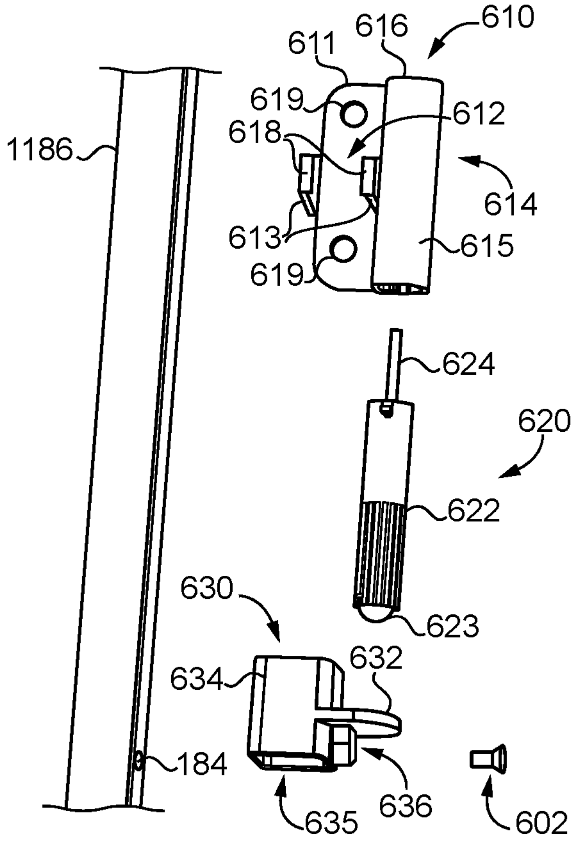
FIG. 26 is an exploded assembly illustration of a vertical rod linear damper assembly according to certain embodiments.
Figure 27:
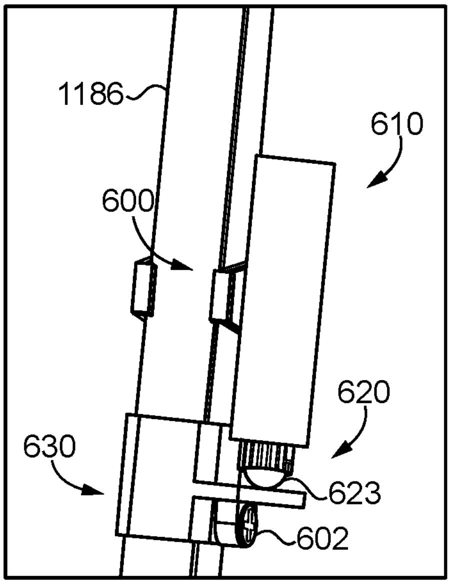
FIG. 27 illustrates the vertical rod linear damper assembly of FIG. 26 with the rod in an extended or deactuated position.
Figure 28:
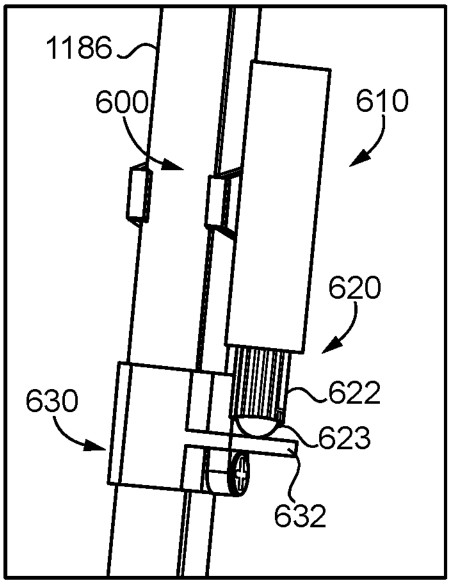
FIG. 28 illustrates the vertical rod linear damper assembly of FIG. 26 with the rod in a retracted or actuated position.
Figure 30:
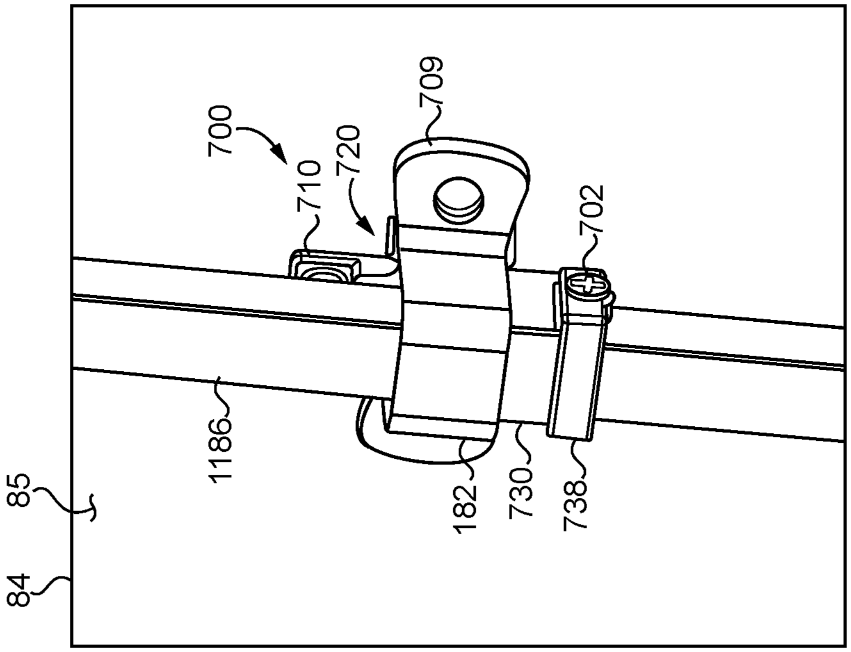
FIG. 30 is a perspective illustration of the vertical rod rotary damper assembly of FIG. 29 as installed.
Figure 29:
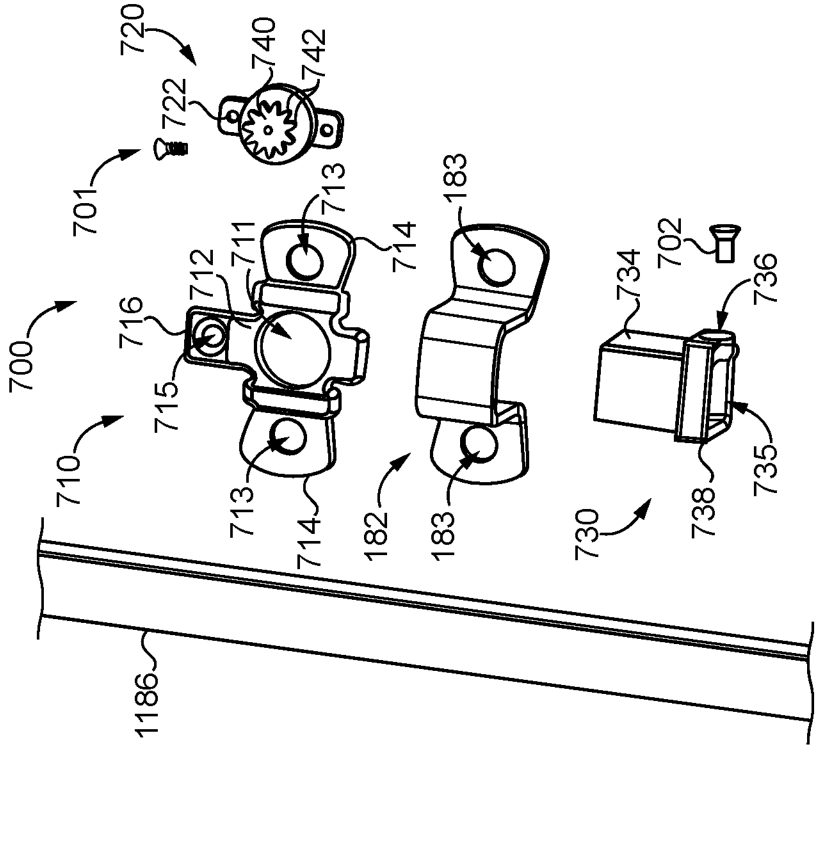
FIG. 29 is an exploded assembly illustration of a vertical rod rotary damper assembly according to certain embodiments.
Figure 31:
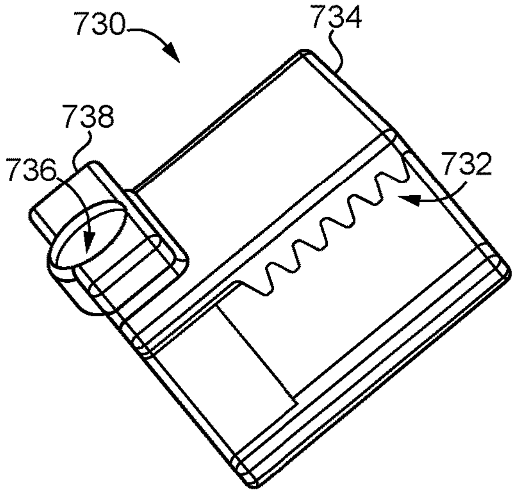
FIG. 31 is a perspective illustration of a component of the vertical rod rotary damper assembly illustrated in FIG. 29.
Figure 32:
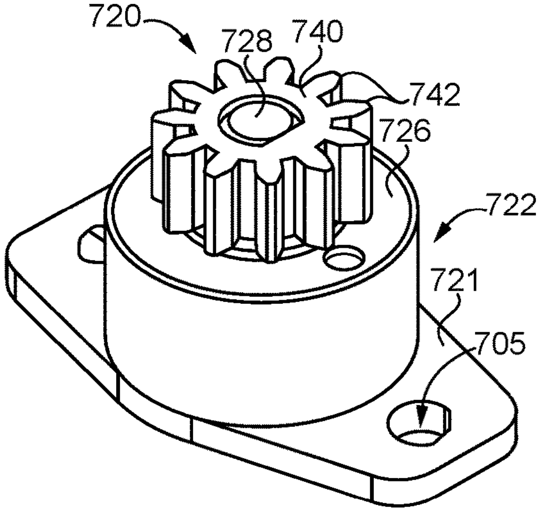
FIG. 32 is a perspective illustration of a rotary damper that may be utilized in the vertical rod rotary damper assembly illustrated in FIG. 29.
Figure 33:
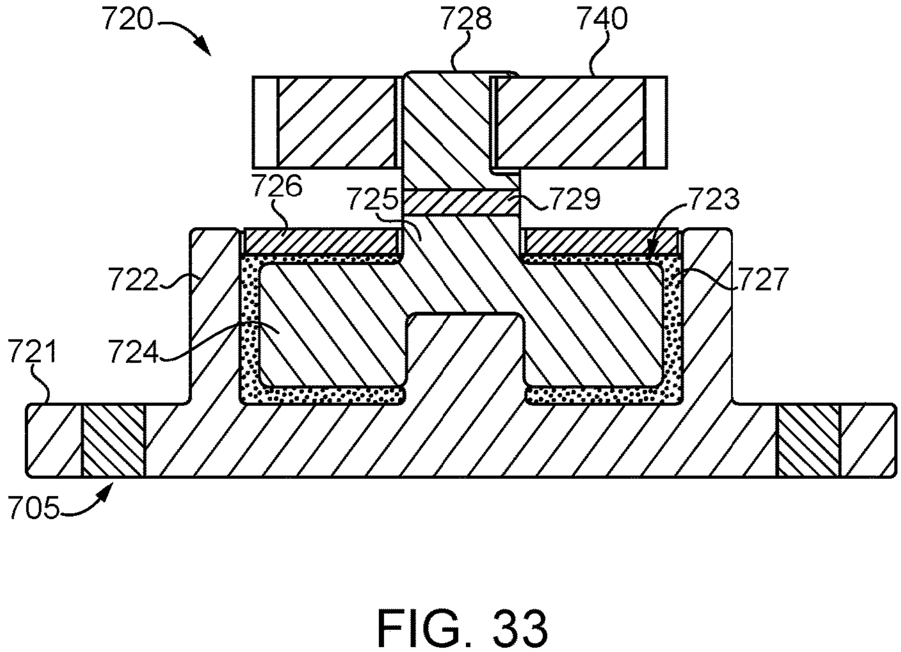
FIG. 33 is a schematic cross-sectional representation of the rotary damper illustrated in FIG. 32.
Figure 34:
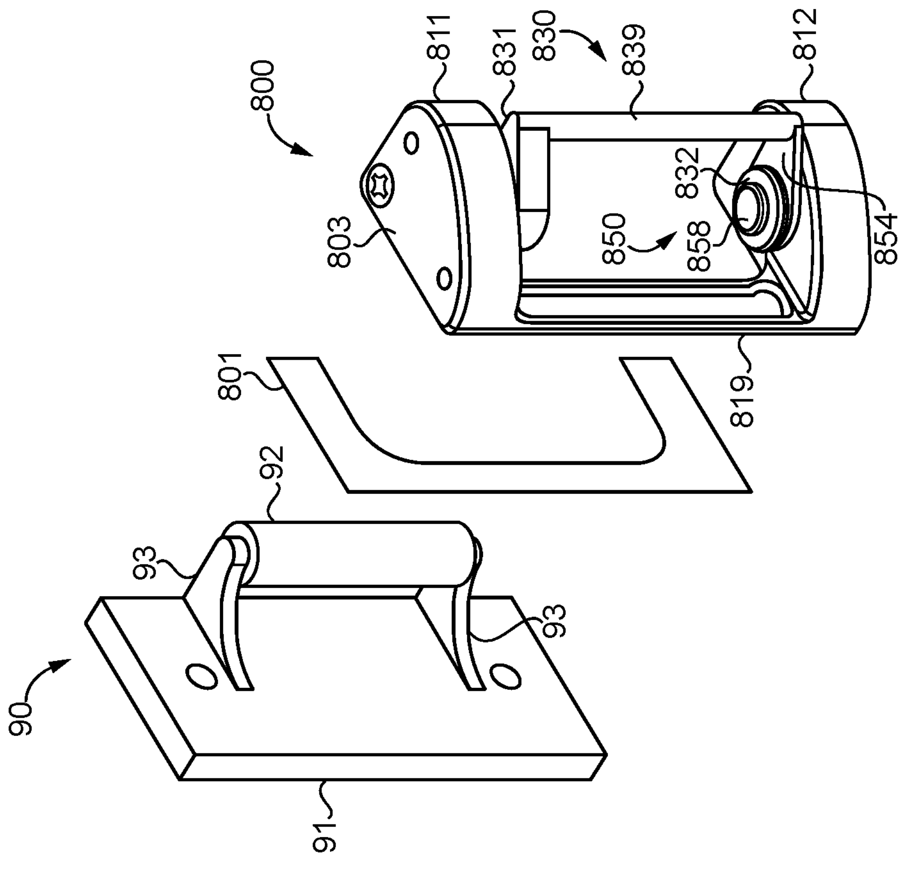
FIG. 34 is a partially-exploded assembly illustration of a strike and a latchbolt damping assembly according to certain embodiments.
Figure 35:
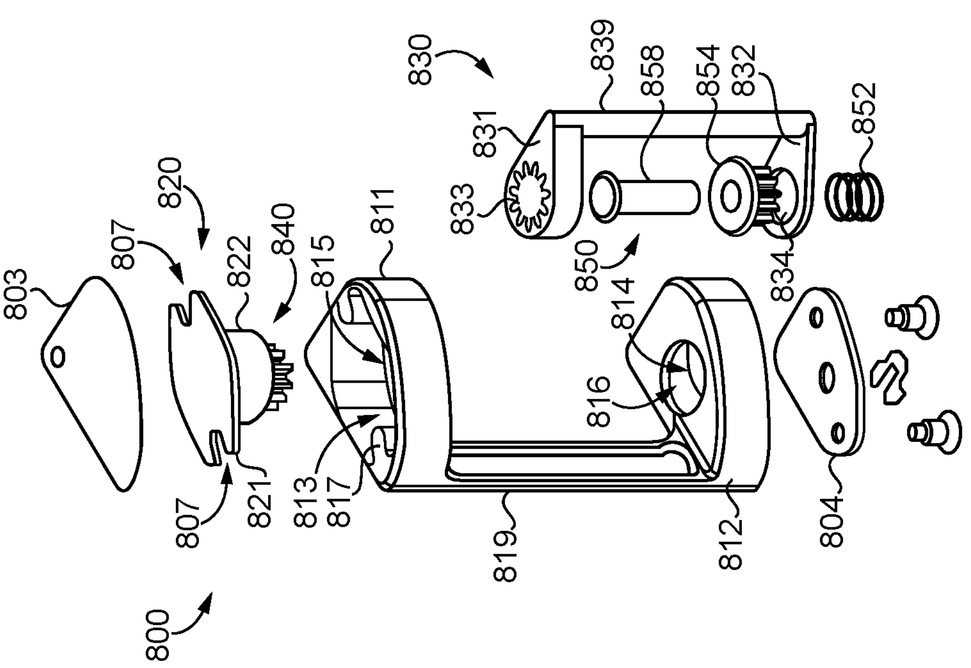
FIG. 35 is an exploded assembly illustration of the latchbolt damping assembly illustrated in FIG. 34.
Figure 36:
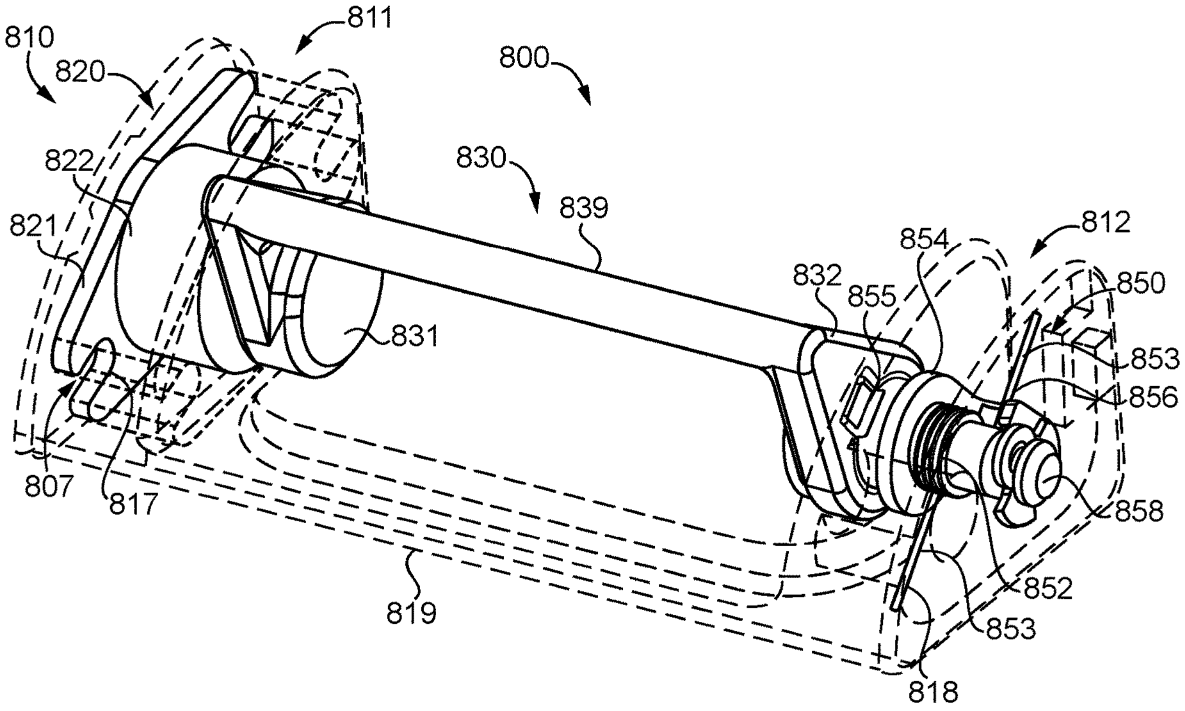
FIG. 36 is a perspective illustration of the latchbolt damping assembly of FIG. 34.

With reference to FIGS. 26-28, illustrated therein is a noise reduction mechanism in the form of an SVR linear damper assembly 600 configured for use with SVR remote latching assemblies, such as those of the type illustrated in FIG. 25. The damper assembly 600 is similar to the above-described connector link damper assembly 200, and similar reference characters are used to indicate similar elements and features. For example, the SVR linear damper assembly 600 includes a housing bracket 610, a linear damper 620, and a stop member 630, which respectively correspond to the housing bracket 210, linear damper 220, and stop member 230 of the above-described connector link damper assembly 200. In the interest of conciseness, the following description of the damper assembly 600 focuses primarily on elements and features that are different from those of the damper assembly 200 and/or were not specifically described with reference to the damper assembly 200.

The housing bracket 610 generally includes a base plate 611, a pair of sidewalls 613 extending from the base plate 611, and a mounting feature 214 including a tube 215 operable to slidably receive the damper 620. The sidewalls 613 are spaced apart from one another such that the sidewalls 613 define a channel 612, and one or both of the sidewalls 613 may terminate in a tab 618 that extends toward the other sidewall and at least partially encloses the channel 612. The base plate 611 may include one or more openings 619 that facilitate mounting of the housing bracket 610 to the door 84. For example, screws may be inserted through the openings 619 and engaged with the material of the door 84 to secure the housing bracket 610 to the interior side face 85 at a location behind the upper rod 1186. The rod 1186 may then be inserted into the channel 612 such that the sidewalls 613 and the tabs 618 aid in constraining the rod 1186 to sliding movement in the lateral directions. With the housing bracket 610 mounted to the door, the tube 615 extends in the lateral directions and terminates in an upper wall 616. As a result, the tube 615 is operable to constrain the damper 620 to movement in the vertical directions, and to limit movement of the damper 620 in the upward direction.

As is the case with certain previous embodiments, the damper 620 is movably mounted to the housing bracket 610. More specifically, the damper 620 is inserted into the tube 615 such that the plunger 624 abuts the upper wall 616, and the body portion 622 is slidingly engaged with one or more walls of the tube 615. Additionally, the bumper 623 projects below the lower extent of the tube 615 such that the stop member 630 is capable of engaging the bumper 623.

The stop member 630 includes a stop wall 632 that extends from a body portion 634 defining an opening 635. The opening 635 is sized and configured to receive the rod 1186 to facilitate coupling of the stop member 630 and the rod 1186. With the rod 1186 received in the opening 635, the stop member 635 can be coupled to the rod 1186, such as by engaging the rod 1186 with a screw 602 that extends through an aperture 636 in the stop member.

In order to place the stop member 630 in the appropriate position relative to the upper rod 1186, the damper assembly 600 may first be partially installed, with the housing bracket 610 mounted to the door 84, the damper 620 mounted to the housing bracket 610, and the stop member 630 slidably seated on the rod 1186. With the rod 1186 in its extended or deactuated position, the stop member 630 is then moved upward such that the stop wall 632 engages the bumper 623 and depresses the plunger 624. With the plunger 624 in its depressed position, the screw 602 is advanced to engage the rod 1186, thereby coupling the rod 1186 and the stop member 630 in the appropriate relative position.

While the location at which the stop member 630 is coupled to the rod 1186 is adjustable in the illustrated embodiment, it is also contemplated that this position may be predetermined. For example, a predetermined location may be defined by the alignment of an aperture 1184 in the rod 1186 and the aperture 636 in the stop member 630. In certain embodiments, the location at which the stop member 630 is coupled to the rod 1186 may be both predetermined and adjustable. For example, the rod 1186 may include plural apertures or an elongated scalloped slot, where each aperture or scallop defines one of the plurality of predetermined locations.

During operation of the exit device 1100, the SVR linear damper assembly 600 functions in a manner analogous to that in which the previously-described linear damper assemblies 200, 300, 400 function. When the exit device 1100 is in its natural deactuated state, the rods 1186, 1187 are retained in the laterally-outward or extended positions thereof, for example by biasing members internal to the latching mechanisms 1160, 1170. In this state (FIG. 27), the stop wall 632 is in close proximity to the housing bracket 610, and engages the damper 620 to retain the plunger 624 in its depressed position. As the exit device 1100 is actuated, the rods 1186, 1187 travel laterally inward, thereby causing the stop wall 632 to move away from the damper 620. As a result, the damper 620 expands under the force of its internal biasing mechanism to the state illustrated in FIG. 28, in which the plunger 624 is in its projected position.

When subsequent deactuation of the exit device 1100 causes the rods 1186, 1187 to travel laterally outward, the stop wall 632 engages the damper 620 and drives the plunger 624 toward its depressed position. This relative movement of the body portion 622 and plunger 624 is resisted by the damper 620, such that the damper 620 slows the extension speed of the upper rod 1186. This in turn slows the deactuating speeds of the latch control assembly 140 and the latching mechanisms 1160, 1170, thereby reducing operational noise in the manner described above.

While the SVR linear damper assembly 600 has been illustrated and described as being associated with the upper rod 1186, it also contemplated that the damper assembly 600 may be rotated about the transverse axis 180° from the illustrated orientation for installation at the lower rod 1187. It is to be appreciated that as a result of the interconnection of the rods 1186, 1187 via the latch control assembly 140, a damper assembly associated with one of the rods 1186, 1187 will also provide for slowing of the other of the rods 1186, 1187. If desired, further slowing of both rods 1186, 1187 may be achieved by using plural instances of the damper assembly 600, or by using the damper assembly 600 in combination with one or more of the above-described damper assemblies 200, 300.

With reference to FIG. 29-33, illustrated therein is a noise reduction mechanism in the form of an SVR rotary damper assembly 700 configured for use with SVR remote latching assemblies, such as those of the type illustrated in FIG. 25. The damper assembly 700 generally includes a housing bracket 710 configured for mounting with the guide bracket 1182, a rotary damper 720 configured for mounting to the housing bracket 710, and a rack member 730 that is configured for mounting to either of the rods 1186, 1187 and which is operable to engage a pinion gear 740 of the rotary damper 720.

The illustrated housing bracket 710 includes a body portion 712, a pair of wings 714 extending from opposite sides of the body portion 712, and a tab 716 extending from another side of the body portion 712. The housing bracket 710 also includes a plurality of apertures that facilitate the installation of the damper assembly 700 to the exit device 1100 and the door 84. More specifically, the housing bracket 710 includes a receiving aperture 711 formed in the body portion 712, a pair of mounting apertures 713 formed in the wings 714, and an attachment aperture 715 formed in the tab 716. The damper 720 is mounted behind the body portion 712 such that a portion of the damper 720 extends through the receiving aperture 711, and may be attached to the housing bracket via the attachment aperture 715. For example, a screw 701 may extend through the attachment aperture 715 and engage a threaded aperture 705 of the damper 720. The mounting apertures 713 are sized and spaced for alignment with corresponding mounting apertures 1183 formed in the guide bracket 1182. In certain embodiments, the guide bracket 1182 may be an existing guide bracket 1182 provided with the exit device 1100. In certain embodiments, the damper assembly 700 may include the guide bracket 1182.

The rotary damper 720 generally includes a base plate 721, a body portion or stator 722 defining a chamber 723, a rotor 724 rotatably mounted to the stator 722, and a cap 726 that encloses the chamber 723. The rotor 724 is mounted in the chamber 723, and includes a stem 725 that extends through an opening in the cap 726. The cap 726 cooperates with the stator 722 and the rotor 724 to form a fluid-tight seal for the chamber 723. The sealed chamber 723 is filled with a hydraulic fluid 727 that generates a resistive torque in response to rotation of the rotor 724 relative to the stator 722, such as silicone oil. The stem 725 is engaged with a shaft 728 via a one-way clutch 729 that couples the stem 725 and shaft 728 for joint rotation in one rotational direction while allowing relative rotation of the stem 725 and shaft 728 in the opposite rotational direction. The pinion gear 740 is mounted to the shaft 728 such that the gear 740 is engaged with the rotor 724 via the one-way clutch 729.

Like the above-described stop member 630, the rack member 730 is configured for mounting to the rods 1186, 1187, and includes a body portion 734 defining an opening 735 sized and shaped to receive and guide the rod 1186, 1187, and an aperture 736 that facilitates the mounting of the rack member 730 to the rod 1186, 1187 using a screw 703. However, in lieu of the stop wall 632, the rack member 730 includes a gear rack 732 sized and shaped to engage the teeth 742 of the gear 740. Additionally, one end portion of the rack member 730 includes a shoulder 738 through which the screw aperture 736 extends, and which facilitates installation of the damper assembly 700 in the manner described herein.

With the damper assembly 700 installed (FIG. 30), the wings 714 of the housing bracket 710 are clamped between the corresponding portions of the guide bracket 1182 by a pair of screws 709, which extend through the mounting apertures 1183, 713 and engage the interior side face 85 of the door 84. The rotary damper 720 and the pinion gear 740 are held in place behind the rod 1186 by the housing bracket 710, and the rack member 730 is attached to the upper rod 1186 such that the gear rack 732 faces the interior side door face 85 and is aligned or engaged with the pinion gear 740.

In certain embodiments, the rack member 730 may be provided with the appropriate location relative to the rod 1186 using a technique similar to that described above with reference to the stop member 630. For example, the damper assembly 700 may first be partially installed, with the housing bracket 710 mounted to the door 84, the damper 720 mounted to the housing bracket 710, and the rack member 730 slidably seated on the upper rod 1186 with the gear rack 732 facing the door 84. With the rod 1186 in its extended or deactuated state, the rack member 730 is then moved upward such that the shoulder 738 abuts the guide bracket 1182, and the screw 802 is advanced to secure the rack member 730 to the rod 1186. In this state, the pinion gear 840 is engaged with the lower end portion of the gear rack 732, which ensures that the pinion gear 740 remains engaged with the gear rack 732 throughout at least the latter portion of the deactuating movement of the upper rod 1186.

During actuation of the exit device 1100, the rods 1186, 1187 move laterally inward in the manner described above, thereby carrying the rack member 730 in the laterally inward direction of the rod 1186/1187 to which it is mounted. This movement of the rack member 730 causes the gear rack 732 to engage the teeth 742 of the pinion gear 740 such that the pinion gear 740 and the shaft 728 rotate in an actuating rotational direction. The directionality of the one-way clutch 729 is selected such that this rotation of the shaft 728 and gear 740 is not transmitted to the rotor 724. As a result, the actuating movement of the pinion gear 740 and the rack member 730 (and thus of the rods 1186, 1187, latching mechanisms 1160, 1170, and latch control assembly 140) is not inhibited by the damper 720.

During a subsequent deactuation of the exit device 1100, the rods move laterally outward in the manner described above, thereby carrying the rack member 730 in the laterally outward direction of the rod 1186/1187 to which it is mounted. This movement of the rack member 730 causes the gear rack 732 to rotate the pinion gear 740 and the shaft 728 in a deactuating rotational direction opposite the actuating rotational direction. The directionality of the one-way clutch 729 is selected such that this rotation of the shaft 728 and gear 740 is transmitted to the rotor 724, thereby causing the rotor 724 to rotate within the hydraulic fluid 727. The hydraulic fluid 727 resists such rotation of the rotor, thereby slowing the movement speed of the pinion gear 740 and the rack member 730. As a result, the deactuating speeds of the rods 1186, 1187, the latching mechanisms 1160, 1170, and the latch control assembly 140 are slowed, thereby reducing the level of noise generated during deactuation of the exit device 1100, such as noise resulting from rattle, impact, and sliding engagement.

Although the SVR rotary damper assembly 700 is illustrated as being associated with the upper rod 1186, it also contemplated that the damper assembly 700 may be rotated about the transverse axis 180° from the illustrated orientation for installation at the lower rod 1187. It is to be appreciated that as a result of the interconnection of the rods 1186, 1187 via the latch control assembly 140, a damper assembly associated with one of the rods 1186, 1187 will also provide for slowing of the other of the rods 1186, 1187. If desired, further slowing of both rods 1186, 1187 may be achieved by using plural instances of the damper assembly 700, or by using the damper assembly 700 in combination with one or more of the above-described damper assemblies 200, 300, 600.

While two embodiments of SVR damper assemblies have been illustrated and described herein, it is to be appreciated that other principles of operation may be utilized to provide the resistance that slows the movement of the rods 1186, 1187. By way of example, a case with magnets may be fit over the rods 1186, 1187 such that eddy current effects slow movement of the rods 1186, 1187 in both directions. Furthermore, while the illustrated exit device 1100 provides for joint movement of the rods 1186, 1187, other exit devices having vertical rods may allow for movement of the rods relative to one another. For exit devices of this type, two instances of a damper assembly and/or a magnetic assembly may be utilized to provide both rods with the desired degree of slowing.

Turning now to FIGS. 34-39, illustrated therein is another embodiment of a noise-reduction mechanism in the form of a latchbolt damping assembly 800 configured for use with exit devices having latchbolts that interface with roller strikes in the manner described herein. While the following descriptions are made with specific reference to the latchbolt 142, it is to be appreciated that the latchbolt damping assembly 800 may be utilized in combination with other forms of latchbolts, such as the latchbolt 1162 of the upper latch mechanism 1160. Unlike the embodiments that are configured to be installed to the door or the exit device itself, the current embodiment is configured to be installed to the frame 82. More particularly, the damping assembly 800 is configured to be mounted to the strike 90, and to slow the deactuating movement of the latchbolt 142 when the door 84 is at or near its closed position.

The strike 90 generally includes a base plate 91, a pair of spaced-apart arms 93 extending from the base plate 91, and a roller 92 rotatably supported by the arms 93. As the door 84 approaches its closed position during normal operation of the exit device 100, the roller 92 engages the latchbolt 142 and urges the latchbolt 142 toward its retracted position. As the door 84 reaches its fully closed position, the latchbolt 142 clears the roller 92 and moves toward its extended position under the urging of the return spring 143. Thereafter, the roller 92 is operable to engage the forward side of the latchbolt 142 to prevent the door 84 from opening while the latchbolt 142 remains in its extended position.

The damping assembly 800 generally includes a housing 810, a rotary damper 820 mounted to the housing 810, a damping arm 830 pivotably mounted to the housing 810 and engaged with a pinion gear 840 of the rotary damper 820, and a biasing mechanism 850 urging the damping arm 830 toward a projected rest position. In the illustrated embodiment, the damping assembly 800 is provided as a retrofit for an existing strike 90, and is configured to be mounted to the strike 90 using a double-sided adhesive tape 801, such as a metal adhesive tape. It is also contemplated that the damping assembly 800 may be configured to be mounted to the strike 90 in another manner, such as using screws or other forms of fasteners. In other embodiments, the strike 90 and the damping assembly 800 may be provided as a unit. For example, the housing 810 may be secured to or integral with the base plate 91 of the strike 90 at the time of sale.

The illustrated housing 810 is configured to be mounted to the base plate 91 of the strike 90, and is generally C-shaped to provide clearance for the roller 92 and the arms 93 of the strike 90. The housing 810 includes a connecting portion 819 from which a pair of spaced-apart limbs 811, 812 extend. Each limb 811, 812 of the housing 810 includes a pocket 813, 814 that receives internal components of the damper assembly 80 and which is covered by a corresponding cover plate 803, 804. As described herein, each pocket 813, 814 is connected to an opening 815, 816 facing the opposite limb 811, 812, and includes an engagement feature 817, 818 configured to engage the internal components housed therein.

The first limb 811 includes a first pocket 813 that receives the rotary damper 820 and which is covered by a first cover plate 803. The first pocket 813 is connected to a first opening 815 through which a portion of the rotary damper 820 extends. Additionally, the first pocket 813 is defined in part by an engagement feature 817 in the form of a pair of protrusions 817 that aid in rotationally coupling a portion of the rotary damper 820 to the housing 810.

Similarly, the second limb 812 includes a second pocket 814 that houses the biasing mechanism 850 and which is covered by a second cover plate 804. The second pocket 814 is connected to a second opening 816 through which a portion of the biasing mechanism 850 extends. Additionally, the second pocket 814 is defined in part by an engagement feature 818 in the form of an anchor wall 818 that provides an anchor point for a torsion spring 852 of the biasing assembly 850.

The rotary damper 820 is substantially similar to the above-described rotary damper 720, and similar reference characters are used to indicate similar elements and features. For example, the damper 820 includes a base plate 821, a stator 822 defining a chamber, a rotor having a stem, a cap, a hydraulic fluid, a shaft, a one-way clutch, and a pinion gear 840, which respectively correspond to the base plate 721, stator 722 defining a chamber 723, rotor 724 having a stem 725, cap 726, hydraulic fluid 727, shaft 728, one-way clutch 729, and pinion gear 740 of the above-described rotary damper 720. In the illustrated form, however, the threaded openings in the base plate have been replaced with a pair of notches 807 configured to matingly engage the protrusions 817 of the first pocket 813. When so engaged, the base plate 821 rotationally couples the stator 822 with the first limb 811, and the pinion gear 840 projects through the first opening 815 and provides a first support bearing for the damping arm 830.

Like the housing 810, the damping arm 830 includes a pair of spaced apart limbs 831, 832 that are connected by a connecting portion 839, which for the damping arm 830 is provided in the form of a contact bar 839 configured to contact the latchbolt 142. The contact bar 839 may be formed of or coated with a cushioning material that dampens vibrations resulting from the impact of the latchbolt 142 on the contact bar 839. The first limb 831 includes a gear-receiving recess 833 configured to matingly receive the pinion gear 840 such that the pinion gear 840 rotationally couples the first limb 831 of the damping arm 830 with the shaft of the rotary damper 820. Similarly, the second limb 832 includes a coupling opening 834 configured to matingly receive a coupling member 854 of the biasing mechanism 850 such that the coupling member 854 is rotationally coupled with the second limb 832 of the damping arm 830.

The biasing mechanism 850 generally includes the torsion spring 852, the coupling member 854, and a pivot pin 858 that provides a second support bearing for the damping arm 830. The torsion spring 852 includes first and second arms 853, which are connected by a coiled portion that biases the arms 853 toward a rest position relative to one another. The coupling member 854 is rotatably mounted to the pivot pin 858, and includes a coupling portion 855 configured to be received in and mate with the coupling opening 834 to rotationally couple with the second limb 832 of the damping arm 830. The coupling member 854 further includes an anchor wall 856 that provides an anchor point for one of the torsion spring arms 853. With the other torsion spring arm 853 engaged with the anchor wall 818 of the housing second limb 812, the torsion spring 852 biases the damping arm 830 toward the projected rest position illustrated in FIGS. 33 and 36.

With the damper assembly 800 assembled, the damping arm 830 is biased toward a projected rest position by the biasing mechanism, and is capable of pivoting between the projected position and a depressed position through an intermediate position. Thus, with the damping arm 830 in the intermediate position, the damping arm 830 is biased in a projecting direction (i.e., toward the projected position) by the biasing mechanism 850, and is capable of being driven in an opposite depressing direction (i.e., toward the depressed position). As a result of the rotational coupling between the damping arm 830 and the pinion gear 840, pivoting of the damping arm 830 in either direction will cause a corresponding rotation of the shaft to which the pinion gear 840 is mounted. Due to the provision of the one-way clutch, however, the rotary damper 820 will resist pivoting of the damping arm 830 only in the depressing direction. Thus, the rotary damper 820 will not inhibit the damping arm 830 from pivoting in the projecting direction under the urging of the biasing mechanism 850.

Figure 37:
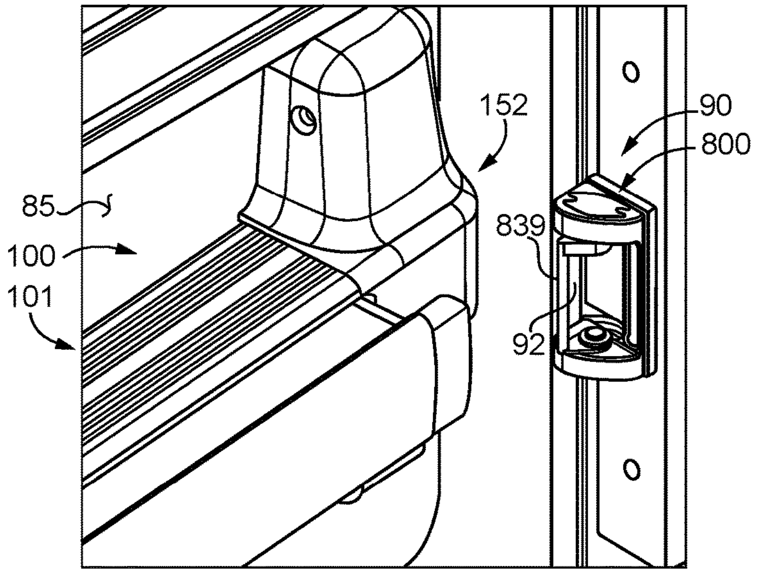
FIG. 37 illustrates the latchbolt damping assembly of FIG. 34 as installed to a door frame, with a door in an open position.
Figure 39:
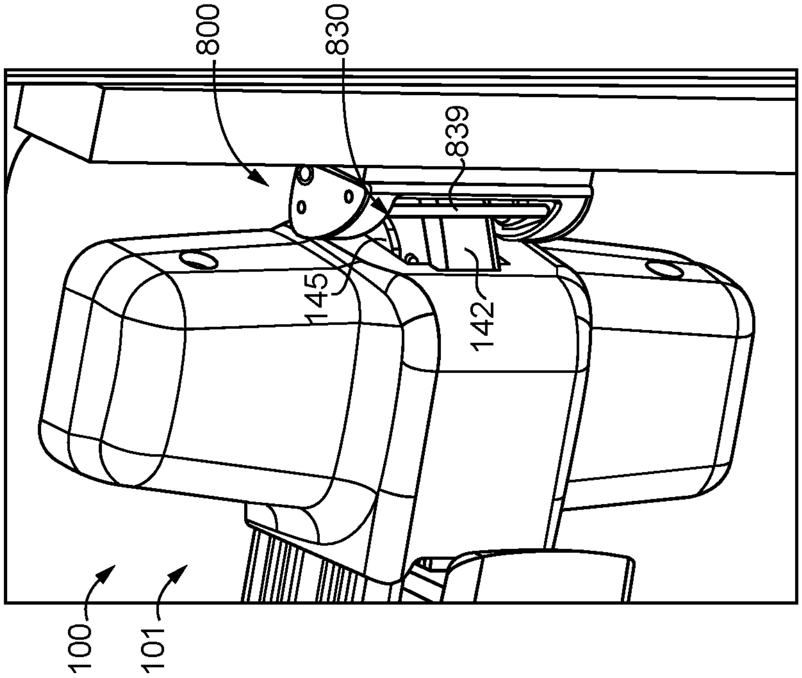
FIG. 39 illustrates the latchbolt damping assembly of FIG. 34 as installed to a door frame, with the door in a fully-closed position.
Figure 38:
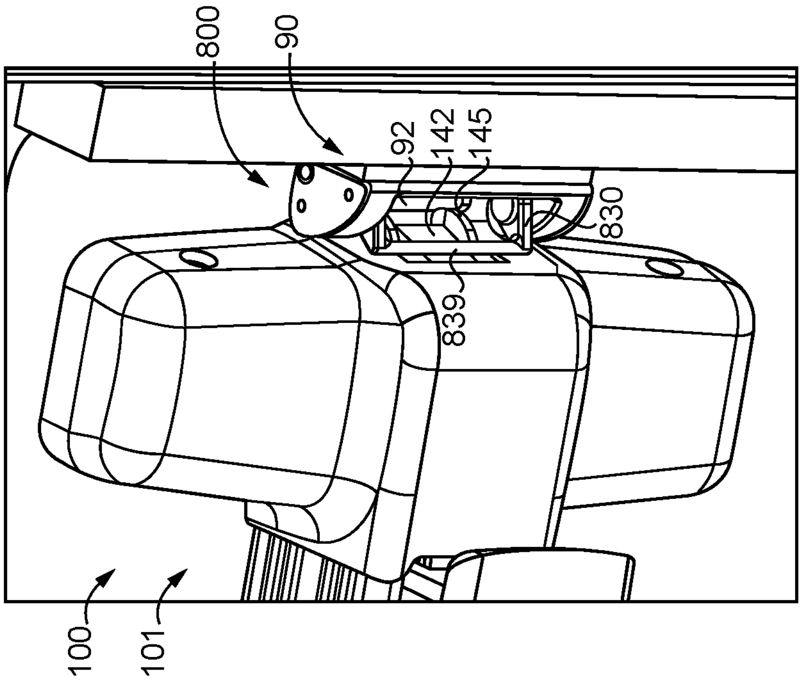
FIG. 38 illustrates the latchbolt damping assembly of FIG. 34 as installed to a door frame, with the door in a partially-closed position.

With reference to FIGS. 37-39, further details regarding the operation of the installed damper assembly 800 will now be provided. In FIG. 37, the damper assembly 800 is illustrated as being installed to the strike 90, and the door 84 is illustrated as approaching its closed position. In this state, the damping arm 830 has adopted its rest position under the urging of the torsion spring 852. With the damping arm 830 in its rest position, the contact bar 839 is positioned adjacent the roller 92. As the door 84 approaches its partially-closed position (FIG. 38), the latchbolt 142 and the guard bolt 145 are driven to their retracted positions by the roller 92, and the latchbolt 142 and/or the guard bolt 145 engage the contact bar 839 and pivot the damping arm 830 from the rest position to an intermediate position.

As the door 84 moves from its partially-closed position (FIG. 38) to its fully-closed position (FIG. 39), the latchbolt 142 clears the roller 92 and begins to move toward its extended position. In doing so, the latchbolt 142 engages the contact bar 839 and begins to pivot the damping arm 830 toward the depressed position. This pivotal movement in the depressing direction is resisted by the rotary damper 820 such that the damping arm 830 slows the extension speed of the latchbolt 142, thereby reducing the operational noise associated with the deactuation of the exit device 100. When the exit device 100 is subsequently actuated to retract the latchbolt 142, the damping arm pivots toward its intermediate position under the urging of the biasing mechanism 850. As the door 84 moves toward its open position, the biasing mechanism 850 returns the damping arm 850 to its projected position.

Figure 40:
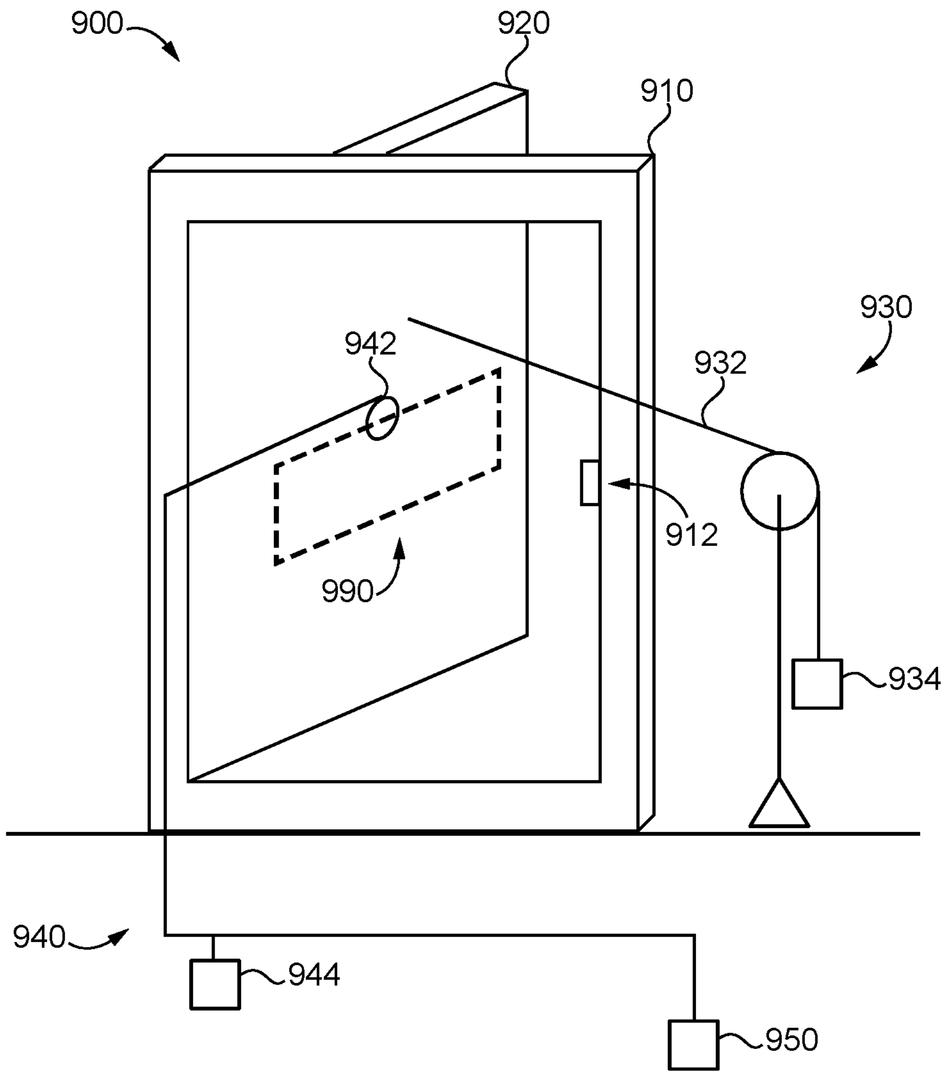
FIG. 40 illustrates a system for evaluating the sound output performance of door hardware.

With reference to FIG. 40, illustrated therein is a system 900 for providing a standardized quantification of the noise generated by various types of door hardware 990, such as the exit devices 100, 100'. The system 900 includes a frame 910, a swinging door 920 pivotally mounted to the frame 910, a pulley system 930, a sensor assembly 940, and a computing device 950 in communication with the sensor assembly 940.

The door 920 includes mounting features that facilitate the mounting of various types of door hardware 990, such as exit devices, hospital latches, and/or other types of hardware. The pulley system 930 has a rope 932 that can be coupled to the door 920 and/or the door hardware 990, such that a weight 934 attached to the rope 932 will cause an operational movement of the door 920 and/or hardware 990 as the weight 934 drops under the force of gravity. The pulley system 930 thereby quietly controls specific operational movements in a controlled fashion. The force exerted by the pulley system 930 may be adjusted by attaching and detaching weights 934. The pulley system 930 provides a simple and repeatable method of quietly operating either the door hardware 990 or the door 920 itself. As will be appreciated, operational movements may be controlled by mechanisms other than the illustrated pulley system 930, such as motorized and/or electronically-controlled mechanisms.

The sensor assembly 940 includes a speed sensor 942 and an acoustic sensor 944. The speed sensor 942 may be mounted to the door 920 or a component of the hardware 990 to measure the speed of the component to which it is mounted during an operational movement. The acoustic sensor 944 is operable to sense the amplitude and frequency of noises generated during the operational movements, and is positioned a predetermined offset distance from the frame 910. The computing device 950 is configured to receive and interpret data from the sensor assembly 940 such that the speed and acoustic data can be analyzed.

In certain embodiments, the offset distance may be constant for all types of door hardware and operational movements under evaluation, which may facilitate the like-for-like comparison of noise generation across different types of door hardware 990 and operational movements. It is also contemplated that the offset distance may be specific to the type of door hardware 990 and/or operational movement being evaluated, in which case the offset distance may vary from one test to the next. The offset distance may be measured with reference to any suitable reference point, such as the strike 912 or the center of the door 920 when the door is in a closed position. In certain forms, the offset distance may be defined in the metric system, such as an offset distance of one meter, two meters, or three meters. In other forms, the offset distance may be defined in the imperial system, such as an offset distance of three feet, five feet, or ten feet.

For certain types of operational movements, the speed sensor 942 and computing device 950 may be used to measure the speed of a moving component during the operational movement, thereby ensuring a repeatable input. For the tests in which the operational movement is to be provided with a given speed, multiple iterations of the operational movement may be performed. Acoustic sensor data associated with iterations in which the operational movement falls outside the specified range of speed may be discarded, and acoustic sensor data associated with iterations in which the operational movement falls within the specified range of speed may be used to quantify the sound performance of the hardware 990 for the operational movement.

For exit devices, the operational movements to be analyzed with the system 900 may take a number of forms. It has been found that three types of operational movements are particularly useful in evaluating the noise performance of exit devices: a drive assembly operational movement, in which the drive assembly is driven to its actuated state and permitted to return to its deactuated state under free release conditions; a door closing and relatching operational movement, in which the door is moved to a closed position and the latchbolt assembly actuates and deactuates as a result of engagement and disengagement with a strike; and a trim operational movement, in which the trim assembly is driven to its actuated state and permitted to return to its deactuated state under free release conditions. While these operational movements are described herein with specific reference to the exit device 100 illustrated in FIGS. 1-4, it is to be appreciated that the descriptions herein may be equally applicable to another form of exit device for which acoustic performance is to be evaluated.

For the drive assembly operational movement, the pushbar 132 may be moved from the extended position to the fully depressed position at a controlled rate of speed, such as 300 mm/s (+/−15 mm/s). The controlled rate of speed may, for example, be provided by the pulley assembly 930 and monitored using the sensor assembly 940 and the computing device 950. The pushbar 132 may then be released such that the drive assembly 120 returns to the deactuated state under the force of the internal biasing mechanisms of the exit device 100, including the main spring 126. Noise generated during the pushbar actuation and free return operational movement may be sensed by the acoustic sensor 944 and received by the computing device 950.

For the door closing and relatching operational movement, the door 920 is opened to a predetermined angle, such as approximately 30°. The door 920 is then closed at a controlled rate of speed that may, for example, be provided by the pulley assembly 930 and monitored using the sensor assembly 940 and computing device 950. It has been found that a closing speed of 900 mm/s+/−50 mm/s is satisfactory, and that such a closing speed can be achieved with a weight 934 of about two pounds. During the final closing movement of the door 920, the latchbolt 142 is driven to the retracted position by a strike 912 mounted to the frame 910. As the door 920 approaches the fully closed position, the latchbolt 142 clears the strike 912 and returns to the extended position under the force of the internal biasing mechanisms of the exit device 100. Noise generated during the door closing and relatching operational movement may be sensed by the acoustic sensor 944 and received by the computing device 950.

For the trim assembly operational movement, the handle 192 is released from its fully rotated position, and is driven to its home position under the force of the internal springs of the trim assembly 180. Noise generated during the trim actuation and return operational movement may be sensed by the acoustic sensor 944 and received by the computing device 950.

As will be appreciated, the system 900 may also be used to quantify sound performance for types of door hardware other than exit devices, including hospital-type latches, mechanical locks, and electromechanical locks. For some types of door hardware, each of the above-described operational movements may be evaluated. For example, door hardware including actuating paddles, such as hospital-type latches, may be evaluated for each of the above-described operational movements. For other types of hardware, such as mechanical locks and electromechanical locks, the pushbar actuation and return operational movement may be inapplicable, and alternative operational movements may be evaluated.

Data from the acoustic sensor 944 may be used to quantify the acoustic performance of the door hardware 990 as that acoustic performance is perceived by the human ear. In certain embodiments, the acoustic performance is evaluated based upon the peak instantaneous loudness as measured in sones. This metric was chosen over more commonly used sound metrics, such as decibels (dB), due to the fact that the sone unit of measure has been found to provide a more accurate representation of the sound level perceived by the human ear. The sone unit takes into account not only the sound pressure level, but also the frequency at which the sound pressure occurs. This is an important factor because the frequency plays a major role in how humans perceive the sound. Another benefit of using this metric is that the sone unit is measured on a linear scale, whereas the decibel unit is measured on a logarithmic scale. For example, when the sound being evaluated is doubled, the measurement in sones will likewise double, while the measurement in decibels will increase by 10 dB. For many people, the linear scale is more intuitive than the logarithmic scale. Thus, the use of such a linear scale may facilitate the comparison of the noise generated by different types of door hardware and/or different operational movements.

The calculation of the loudness level in sones may be performed according to any of a number of methods known in the art. In certain embodiments, the loudness level may be calculated for room field or diffuse field conditions, whereas in other embodiments, the loudness level may be calculated for direct field or free field conditions. Additionally, the loudness level may be calculated based upon individual frequencies, or based upon frequency groups.

When evaluating the loudness of door hardware, it may be desirable that the peak instantaneous loudness generated during one or more operational movements fall within a target range. The target range for each of the operational movements includes a target maximum peak instantaneous loudness level. When evaluating exit devices with an offset distance of one meter, the following maximum peak instantaneous loudness levels are achievable and should be the target for the industry: pushbar actuation and free return—30 sones; door closing and relatching—25 sones; trim actuation and free release—10 sones.

In certain circumstances, it may be desirable to reduce the noise generated during one or more operational movements without completely eliminating such noise. By way of example, it may be desirable that the relatching operational movement result in a quiet but audible noise, such as a click. Such an audible noise may provide an indication to the user that the relatching operational movement has been completed, and that the door is once again latched to the frame. Accordingly, the target range for one or more of the operational movements may have a non-zero target minimum peak instantaneous loudness level, such as 5 sones or 10 sones.

It has been found that the targets described above can be achieved by implementing one or more of the above-described noise reduction mechanisms into an exit device such as the exit device 100. Due to the modular nature of the above-described noise reduction mechanisms, the noise reduction mechanisms can be easily installed in various combinations and configurations to provide the exit device 100 with desired acoustic performance properties. Additionally, while the noise reduction mechanisms are illustrated and described herein as being configured for use with the exit device 100 illustrated in FIGS. 1-4, it is to be appreciated that the principles described herein may be applied to achieve similar noise reductions for other types of door hardware, including other forms of exit devices.

While the noise reduction mechanisms have thus far been illustrated and described with respect to certain particular exit devices and trim assemblies, it is to be appreciated that the noise reduction mechanisms described herein may be utilized in connection with exit devices and trim assemblies of other formats. Certain illustrative examples of the manner in which the noise reduction mechanisms may be utilized in combination with existing exit devices and trim assemblies will now be provided with reference to FIGS. 41-45.

Figure 41:
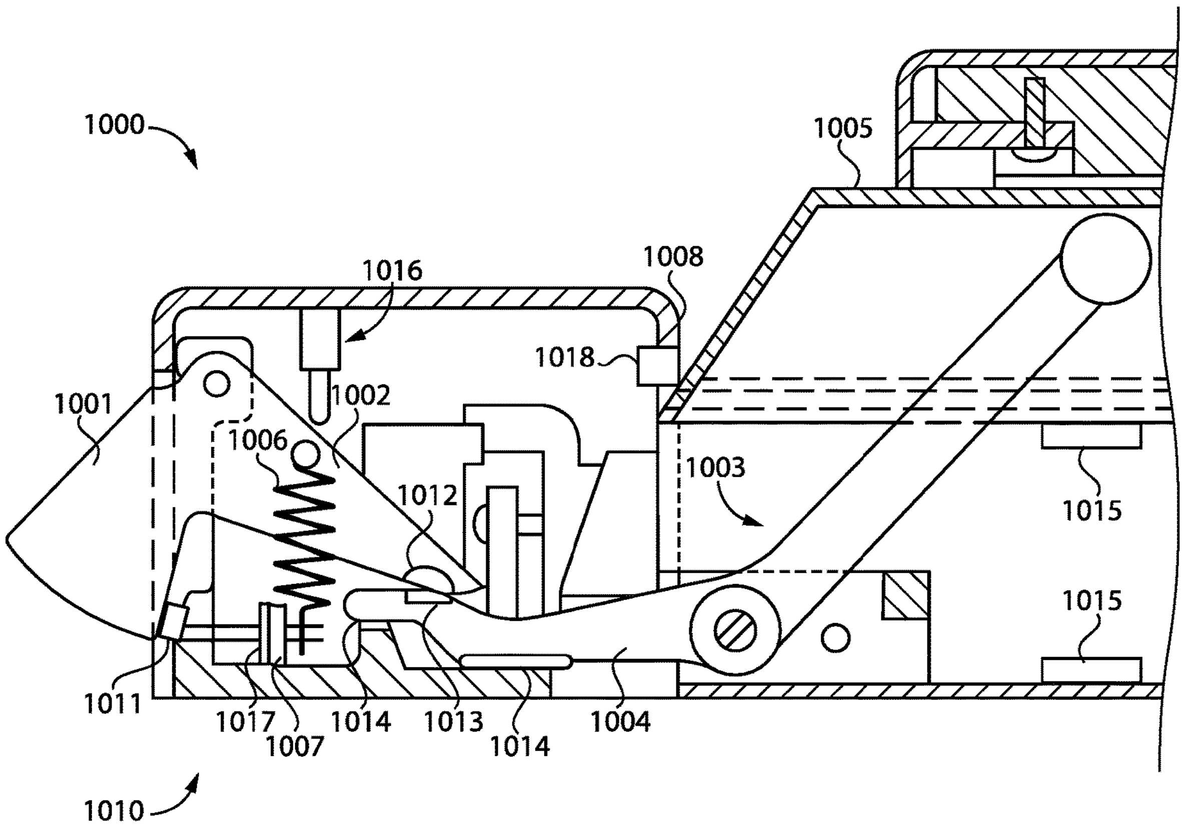
FIG. 41 is a cross-sectional illustration of an exit device and a noise reduction assembly according to certain embodiments.

FIG. 41 illustrates one existing design of exit device 1000, along with a noise reduction assembly 1010 according to certain embodiments. The exit device 1000 generally includes a pivotally-mounted latchbolt 1001 having a tang 1002, a rocker lever 1003 having an arm 1004 engaged with the tang 1002, and a pushbar 1005 engaged with the rocker lever 1003. A spring 1006 is engaged with the tang 1002 and biases the latchbolt 1001 to its extended position. As the user depresses the pushbar 1005, the rocker lever 1003 pivots in the clockwise direction, and the arm 1004 engages the tang 1002 to drive the latchbolt 1001 to its retracted position, where it engages a stop wall 1007. When the pushbar 1005 is released, the spring 1006 returns the latchbolt 1001 to its extended position, and the tang 1002 engages the arm 1004 to pivot the rocker lever 1003 in the counter-clockwise direction. As a result, the rocker lever 1003 drives the pushbar 1005 to its projected position, where it engages a lip 1008 that prevents further movement of the pushbar 1005 in the projecting direction.

To reduce the amount of noise generated during the above-described operations, the exit device 1000 may be provided with a noise reduction assembly 1010 including one or more noise reduction mechanisms along the lines of those described above. In certain embodiments, a damper assembly similar to the above-described damper assembly 200 may be mounted in the exit device 1000 to slow the deactuating speed of the latchbolt 1001, the rocker lever 1003, and/or the pushbar 1005. By way of example, a damper assembly 1016 may act in the direction opposite the biasing force of the spring 1006 to slow the extension speed of the latchbolt 1001, thereby slowing the deactuating speed of the rocker lever 1003. Alternatively, the spring 1006 may be replaced with a spring-damper arrangement that provides both the biasing force and the resistive force.

Additionally or alternatively, cushioning components may be utilized to reduce vibrations resulting from impact between relatively movable components of the exit device 1000. For example, the impact between the latchbolt 1001 and the stop wall 1007 may be dampened by a cushion 1011 mounted to the rear side of the latchbolt 1001 and/or a cushion 1017 mounted to the front side of the stop wall 1007. Similarly, the impact between the tang 1002 and the arm 1004 may be dampened by a cushion 1012 mounted to the lower side of the tang 1002 and/or a cushion 1014 mounted to the upper side of the arm 1004. Further examples include cushions 1013 mounted at the interface between the rocker lever 1003 and the header plate, cushions 1015 mounted at the interface between the pushbar 1005 and the mounting plate, and cushions 1018 at the interface between the pushbar 1005 and the lip 1008. In certain embodiments, one or more of the cushioning components may be a bumper similar to the bumpers 542 of the bumpstop assembly 540. In certain embodiments, one or more of the cushioning components may be a pad such as the pads 554 of the bumpstop assembly 550. Furthermore, one or more of the impacting components may be made of a noise damping metal material.

Figure 42:
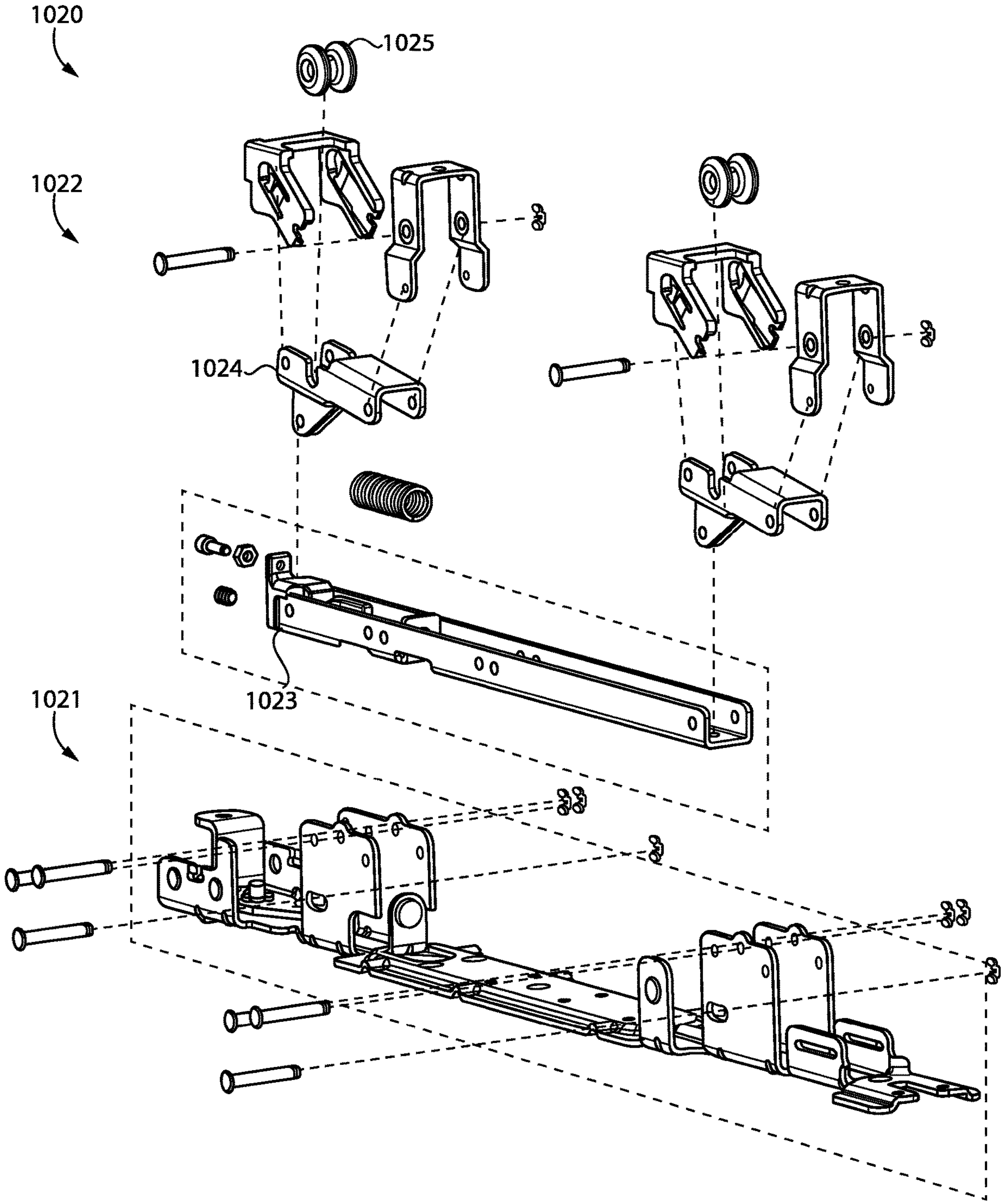
FIG. 42 is an exploded assembly view of a portion of an exit device that may be utilized in connection with certain embodiments.

FIG. 42 illustrates another exit device 1020 that may benefit from one or more noise reduction mechanisms. The exit device 1020 generally includes a mounting assembly 1021, and a drive assembly 1022 movably mounted to the mounting assembly 1021. The drive assembly 1022 includes a drive rod 1023, which is mounted to the mounting assembly 1021 via a bell crank 1024. A roller 1025 is mounted to the bell crank 1024 and provides for a rolling interface between the bell crank 1024 and other components of the exit device 1020. The noise generated during such interaction may be reduced by increasing the diameter of the roller 1025 and/or forming the roller of a softer material.

Further reductions in operational noise may be achieved by implementing one or more of the above-described noise reduction mechanisms and/or other forms of noise reduction mechanisms. By way of example, one or more damper assemblies may be utilized to reduce the deactuating speed of the drive assembly 1022, and cushions such as bumpers and/or pads may be provided at various points of impact between relatively moving components. For example, a rubber stop may be placed behind the latchbolt to dampen the impact of the latchbolt as it reaches its retracted position. As another example, various components of the exit device 1020 may be formed of a noise damping metal material, and/or a clip may be added to the channel cover and/or other components to reduce rattle.

Figure 43:
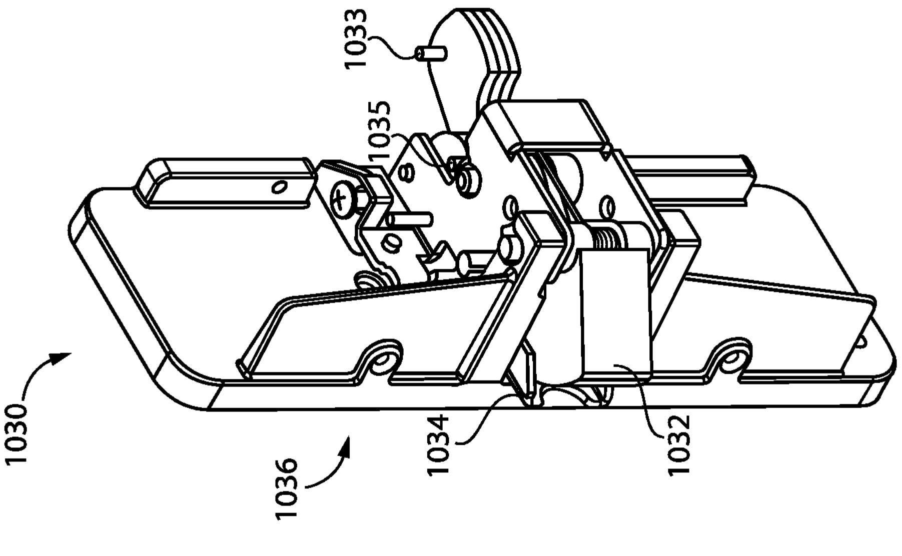
FIG. 43 is a perspective view of a portion of an exit device that may be utilized in connection with certain embodiments.

FIG. 43 illustrates a portion of another exit device 1030, which generally includes a latchbolt 1032 and a guard bolt 1034, each of which is movably mounted to a mounting assembly 1036. The guard bolt 1034 is biased toward a projected position, and is configured to move toward a depressed position when acted upon by the strike plate of an associated door. When in the depressed position, the guard bolt 1034 actuates a deadlocking mechanism that prevents the latchbolt 1032 from being pushed to its retracted position by externally-applied tampering forces, while permitting the latchbolt 1032 to be pulled to its retracted position by appropriate actuating forces, such as those pulling a pin 1033 mounted to a retractor of the latchbolt 1032. The guard bolt 1034 similarly has a pin 1035 that moves therewith.

In certain forms, a damper assembly similar to the above-described damper assemblies may be utilized in connection with the exit device 1030 to slow the extension speed of the latchbolt 1032 and/or the projection speed of the guard bolt 1034. For example, to slow the extension speed of the latchbolt 1032, a housing bracket may be mounted to the mounting assembly 1036, a damper may be mounted to the housing bracket, and a stop member may be mounted to the pin 1033 such that the stop member engages the damper as the latchbolt moves from its retracted position to its extended position. Similar arrangements may be utilized to slow the projecting speed of the guard bolt 1034. As will be appreciated, additional noise reduction mechanisms, such as cushions and damping grease, may also be utilized in connection with this form of exit device 1030.

Figure 44:
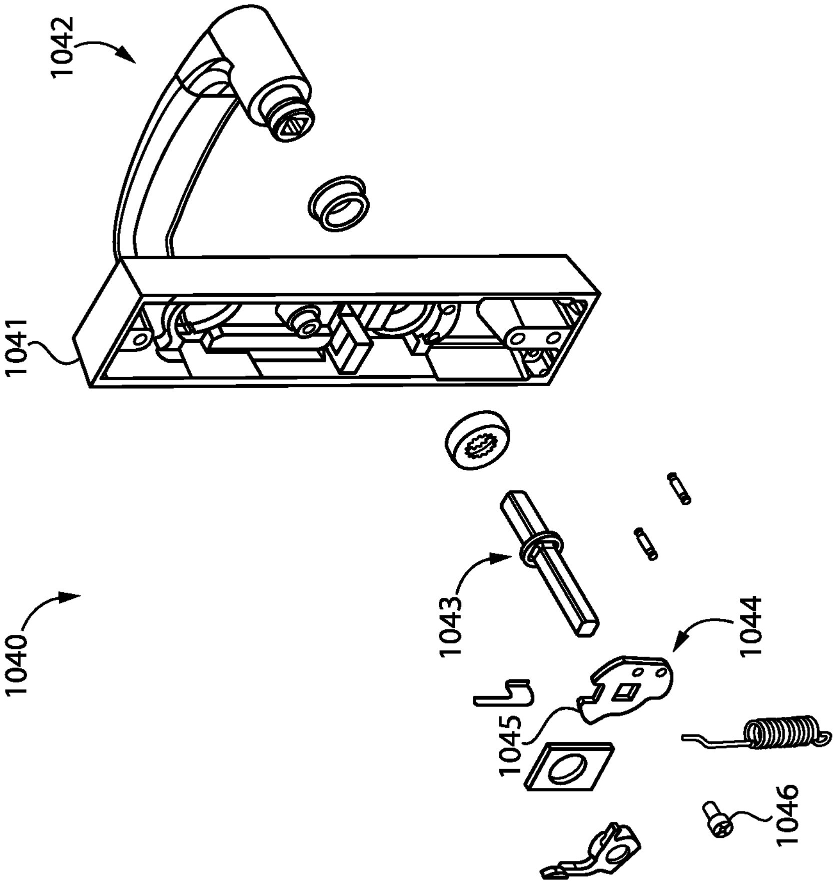
FIG. 44 is an exploded assembly view of a trim assembly that may be utilized in connection with certain embodiments.

FIG. 44 illustrates a trim assembly 1040 that may be utilized in connection with certain embodiments. The trim assembly 1040 generally includes an escutcheon 1041, a lever 1042 rotatably mounted to the escutcheon 1041, and a spindle 1043 extending from the shank of the lever 1042. The spindle 1043 passes through and is rotationally coupled with a plate 1044 having an extension 1045. A stop screw 1046 is secured to the escutcheon 1041, and is located within the path along which the extension 1045 travels as the plate 1044 rotates with the spindle 1043 and the lever 1042. As a result, the extension 1045 impacts the stop screw 1046 is the plate 1044 rotates, and the stop screw 1046 thereby limits the rotational range of the lever 1042.

The amount of noise generated during the operation of the trim assembly 1040 may be reduced by using one or more noise-reducing mechanisms along the lines set forth above. For example, the head of the stop screw 1046 may be placed within an annular bumper similar to the bumpers 542 of the bumpstop assembly 540, thereby dampening the impact of the extension 1045 and the stop screw 1046. Additionally or alternatively, a rack gear may be movably mounted in the escutcheon 1041 or the case of an exit device associated with the trim assembly 1040, and a pinion gear mounted to the spindle 1043 may drive the rack gear to move linearly in response to rotation of the spindle 1043. In such forms, the rack gear may be mounted to a stop member such that the stop member reciprocates in response to rotation of the lever 1042. The reciprocating movement in the deactuating direction may be slowed using a damper in a manner similar to that described above with the reference to the damper assemblies 200, 300, 400.

Figure 45:
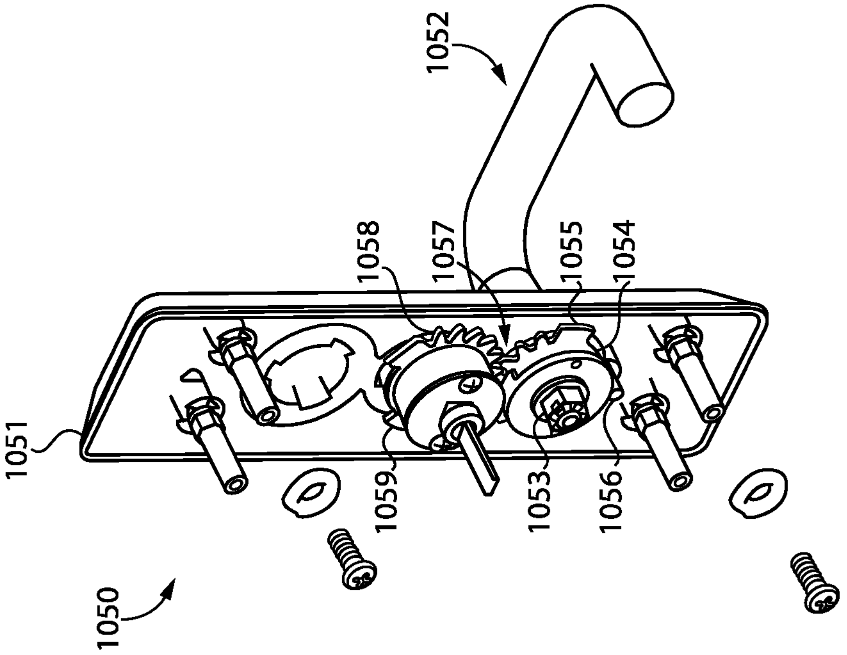
FIG. 45 is a perspective view of a trim assembly that may be utilized in connection with certain embodiments.

FIG. 45 illustrates another trim assembly 1050 that may be utilized in connection with certain embodiments. Like the above-described trim assembly 1050, the trim assembly 1050 generally includes an escutcheon 1051, a lever 1052 rotatably mounted to the escutcheon 1051, a spindle 1053 extending from the shank of the lever 1052. The spindle 1053 passes through and is rotationally coupled with a plate 1054 having an extension 1055. A stop member 1056 is secured to the escutcheon 1051, and is located within the path along which the extension 1055 travels as the plate 1054 rotates with the spindle 1053 and the lever 1052. As a result, the extension 1055 impacts the stop member 1056 is the plate 1054 rotates, and the stop member 1056 thereby limits the rotational range of the lever 1052. To dampen this impact, a bumper may be mounted to the stop member 1056 in a manner analogous to that described above with reference to the trim assembly 1040.

The plate 1054 also includes gear teeth 1057, which mesh with the gear teeth 1057 of a second plate 1058 mounted above the first plate 1054. As a result, both plates 1054, 1058 rotate with the lever 1052. In certain embodiments, the gear teeth 1057 may be used to drive a reciprocating rack member and the movement of the rack member in the deactuating direction may be slowed by a damper in a manner similar to that described above. Additionally or alternatively, the gear teeth 1057 may be meshed with a third gear mounted to a unidirectional rotary damper, the directionality of which is selected to slow the deactuating movement of the gear plates 1054, 1058 without slowing the actuating movement thereof. Further noise reduction may be achieved by applying damping grease to the teeth 1057, forming the secondary gear plate 1058 out of plastic, or mounting a damper to engage a shoulder 1059 of the second plate 1058.

Figure 46:
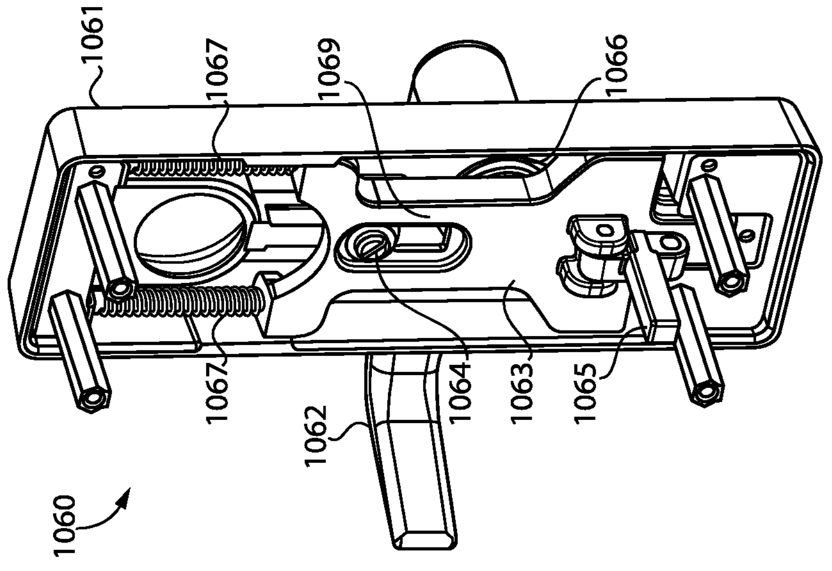
FIG. 46 is a perspective view of a trim assembly that may be utilized in connection with certain embodiments.

FIG. 46 illustrates another trim assembly 1060 that may be utilized in connection with certain embodiments. The trim assembly 1060 includes an escutcheon 1061 and a lever 1062 rotatably mounted to the escutcheon 1061. A shuttle 1063 is slidably mounted to the escutcheon via a stop screw 1064, which is seated in a slot 1069. The stop screw 1064 and the walls of the slot cooperate to limit the vertical travel of the shuttle 1063. A lift finger 1065 extends from the shuttle 1063 and is operable to engage the latch control assembly of a corresponding exit device, such as the exit device 1020 illustrated in FIG. 42. The lever 1062 is connected with a cam 1066, and rotation of the lever 1062 causes the cam 1066 to drive the shuttle 1063 upward against the force of a pair of springs 1067. When the lever 1062 is released, the springs 1067 drive the shuttle 1063 downward, and the cam 1066 returns the lever 1062 to its neutral position.

The amount of operational noise generated by the trim assembly 1060 may be reduced by installing a noise reducing mechanism similar to the above-described trim damper assembly 400. Such a damper assembly may, for example, be utilized to slow the downward movement of the shuttle 1063 under the force of the biasing springs 1067, thereby slowing the deactuating movement of the lever 1062. Additionally or alternatively, a soft bumper may be installed in the slot 1069 or on the stop screw 1064 to dampen the impact of the shuttle at either end of its travel.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An exit device, comprising:

a housing assembly configured for mounting to a door, wherein the housing assembly comprises a channel member and a header case at a proximal end of the channel member;

a pushbar movably mounted to the housing assembly for movement between a projected position and a depressed position;

a bolt mounted in the header case and operably connected with the pushbar such that movement of the pushbar drives the bolt between an extended position and a retracted position, wherein movement of the bolt from the retracted position to the extended position causes a first component to contact a second component at a point of contact;

a contact dampener configured to dampen vibrations resulting from contact between the first component and the second component, wherein the contact dampener comprises a noise damping metal material; and a pushbar guide mounted to the channel member, wherein the pushbar guide comprises a lip that extends around a proximal end portion of the pushbar and defines a barrier between the header case and the proximal end portion of the pushbar such that the pushbar guide dampens impact of the pushbar against the housing assembly during depression of the pushbar.

2. The exit device of claim 1, wherein the first component is formed of the noise damping metal material at the point of contact.

3. The exit device of claim 1, wherein movement of the bolt from the extended position to the retracted position causes a third component to impact a fourth component at a point of impact; and wherein the system further comprises an impact dampener configured to dampen vibrations resulting from impact between the third component and the fourth component.

4. The exit device of claim 3, wherein the contact dampener and the impact dampener are of different configurations.

5. The exit device of claim 3, wherein the impact dampener is positioned at the point of impact.

6. The exit device of claim 1, wherein the first component comprises a rocker lever engaged between the pushbar and the bolt.

7. The exit device of claim 1, wherein the contact dampener is positioned at the point of contact.

8. The exit device of claim 1, wherein the first component further comprises an additional metal material different from the noise damping metal material.

9. The exit device of claim 1, wherein the pushbar is biased to the projected position and movable to the depressed position; and wherein a maximum peak instantaneous loudness level measured one meter from the pushbar during actuation and free return of the pushbar is no greater than 30 sones.

10. The exit device of claim 1, wherein the bolt is biased toward an extended position; and wherein a maximum peak instantaneous loudness level measured one meter from the bolt during free extension of the bolt is no greater than 25 sones.

11. The exit device of claim 1, wherein the noise damping metal material comprises a plurality of metal layers joined by one or more adhesive layers.

12. The exit device of claim 1, wherein the lip comprises a cutout operable to receive a portion of the pushbar when the pushbar is in the depressed position.

13. The exit device of claim 1, wherein the pushbar is formed of a first material; and wherein pushbar guide is formed of a second material having a lower hardness than the first material.

14. The exit device of claim 1, wherein each of the pushbar and the header case comprises metal; and wherein the pushbar guide is formed of a plastic material and prevents metal-to-metal contact between the pushbar and the header case.

15. An exit device, comprising:

a housing assembly configured for mounting to a door, the housing assembly comprising a channel member and a header case positioned at a proximal end of the channel member;

a pushbar movably mounted to the housing assembly;

a bolt mounted in the header case and operably connected with the pushbar such that movement of the pushbar drives the bolt between an extended position and a retracted position, wherein movement of the bolt from the retracted position to the extended position causes a first component to contact a second component at a point of contact; and a plastic guide member mounted to the channel member, wherein the plastic guide member receives a proximal end portion of the pushbar such that the plastic guide member forms a barrier between the pushbar and the header case to thereby dampen impact between the pushbar and the housing assembly during actuation of the pushbar;

wherein the first component is formed of a noise damping metal material at the point of contact.

16. The access control device of claim 15, wherein the second component comprises the noise damping metal material at the point of contact.

17. The access control device of claim 15, further comprising a fluid damper configured to slow impact of the first component and the second component.

18. The access control device of claim 15, wherein the first component is the bolt.

19. The access control device of claim 15, wherein the housing assembly comprises the first component; and wherein the first component is stationary within the housing assembly.

20. The access control device of claim 15, wherein the first component comprises a rocker lever engaged between the pushbar and the bolt.

* * * * *